(12) United States Patent
Balzer et al.

(10) Patent No.: US 6,462,650 B1
(45) Date of Patent: Oct. 8, 2002

(54) TIRE MODULE ATTACHMENT MOUNT

(76) Inventors: Raymond J. Balzer, 109 Kelly La., Easley, SC (US) 29642; Preston Butler Kemp, Jr., 710 Bennett St., Greenville, SC (US) 29609; Cecil Young, 108 Cardinal Dr., Lyman, SC (US) 29365; David Kevin Stafford, 3 North Holly Thorn Ct., Simpsonville, SC (US) 29681

(*) Notice: Subject to any disclaimer, the term of this patent is extended or adjusted under 35 U.S.C. 154(b) by 0 days.

(21) Appl. No.: 09/638,523

(22) Filed: Aug. 11, 2000

(51) Int. Cl.$^7$ ............................................. B60C 23/00
(52) U.S. Cl. ................... 340/442; 340/445; 152/152.1; 73/146; 73/146.4; 73/146.5; 307/10.1; 156/60
(58) Field of Search ................................ 340/442, 445, 340/447; 152/152.1; 73/146, 146.4, 146.5; 307/10.1; 156/60, 153

(56) References Cited

U.S. PATENT DOCUMENTS

| | | | |
|---|---|---|---|
| 3,787,806 A | 1/1974 | Church | 340/58 |
| 3,873,965 A | 3/1975 | Garcia | 340/58 |
| 4,067,235 A | 1/1978 | Markland et al. | 73/146.5 |
| 4,246,567 A | 1/1981 | Miller | 340/58 |
| 4,334,215 A | 6/1982 | Frazier et al. | 340/539 |
| 4,384,482 A * | 5/1983 | Snyder | 73/146.5 |
| 4,862,486 A | 8/1989 | Wing et al. | 377/16 |
| 4,911,217 A | 3/1990 | Dunn et al. | 152/152.1 |
| 4,938,645 A | 7/1990 | Woilar | 411/508 |
| 5,181,975 A | 1/1993 | Pollack et al. | 152/152.1 |
| 5,218,861 A | 6/1993 | Brown et al. | 73/146.5 |
| 5,468,108 A | 11/1995 | Sullivan et al. | 411/510 |
| 5,500,065 A | 3/1996 | Koch et al. | 156/123 |
| 5,562,787 A * | 10/1996 | Koch et al. | 156/64 |
| 5,573,610 A | 11/1996 | Koch et al. | 156/123 |
| 5,573,611 A * | 11/1996 | Koch et al. | 152/152.1 |
| 5,637,926 A * | 6/1997 | Zedonis | 307/10.1 |
| 5,708,411 A * | 1/1998 | Hill | 340/447 |
| 5,718,025 A | 2/1998 | Courtin | 24/453 |
| 5,731,754 A | 3/1998 | Lee, Jr. et al. | 340/447 |
| 5,798,689 A * | 8/1998 | Huang | 340/447 |
| 5,877,679 A * | 3/1999 | Prottey | 340/442 |
| 5,945,908 A * | 8/1999 | Nowicki et al. | 340/447 |
| 6,030,478 A * | 2/2000 | Koch et al. | 156/123 |
| 6,105,423 A | 8/2000 | Prottey | 73/146.5 |
| 6,175,301 B1 * | 1/2001 | Piesinger | 340/442 |
| 6,192,746 B1 * | 2/2001 | Wilson | 73/146 |
| 6,217,683 B1 * | 4/2001 | Balzer et al. | 156/60 |

FOREIGN PATENT DOCUMENTS

| | | | |
|---|---|---|---|
| EP | 0639472 | 2/1995 | B60C/13/00 |
| FR | 2661373 | 10/1991 | B60C/23/04 |

* cited by examiner

*Primary Examiner*—Daniel J. Wu
*Assistant Examiner*—Toan Pham
(74) *Attorney, Agent, or Firm*—Flint & Kim, P.A.; Robert R. Reed

(57) ABSTRACT

The present invention provides a tire monitor apparatus and monitored vehicle tire. A module which monitors tire information is supported by a rubber ply affixed to the inside surface of the tire. The module has electrical components for monitoring tire information by collecting, storing and/or reading information about the tire. A retainer assembly is used to secure the module to the rubber ply such that the module is support within the tire's cavity. The module is mounted to be removed, exchanged, etc. In one embodiment, the monitor module may be isolated from tire loads such that the durability of the monitoring system is improved. The fastener assembly has first parts carried by the rubber ply and second fastener parts built into the module. The first and second fastener parts cooperate to support said module from said rubber ply. The first part may be in the form of a shaft or stem having an axial length which allows the module to be retained at an offset distance from the ply and tire. A damping element may also be used to limit movement and vibrations of the module, all of which adds to the reliability and life of the monitor.

23 Claims, 14 Drawing Sheets

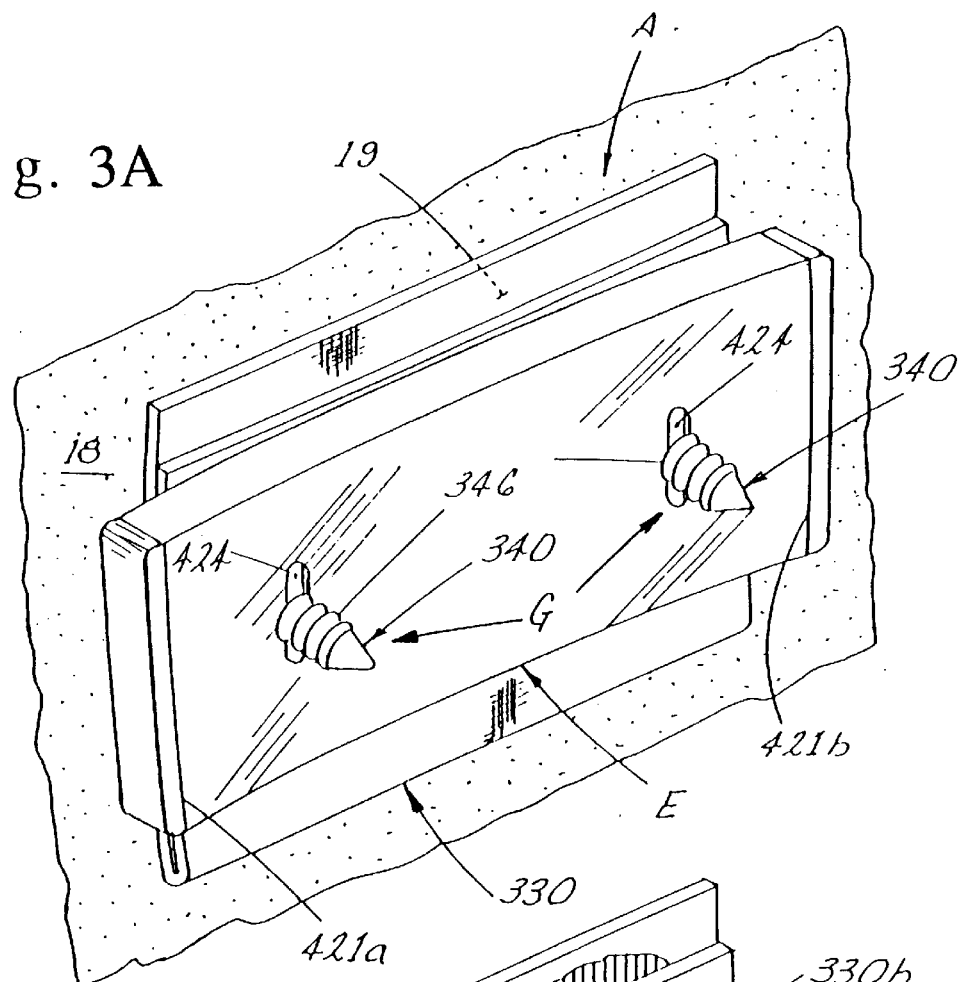
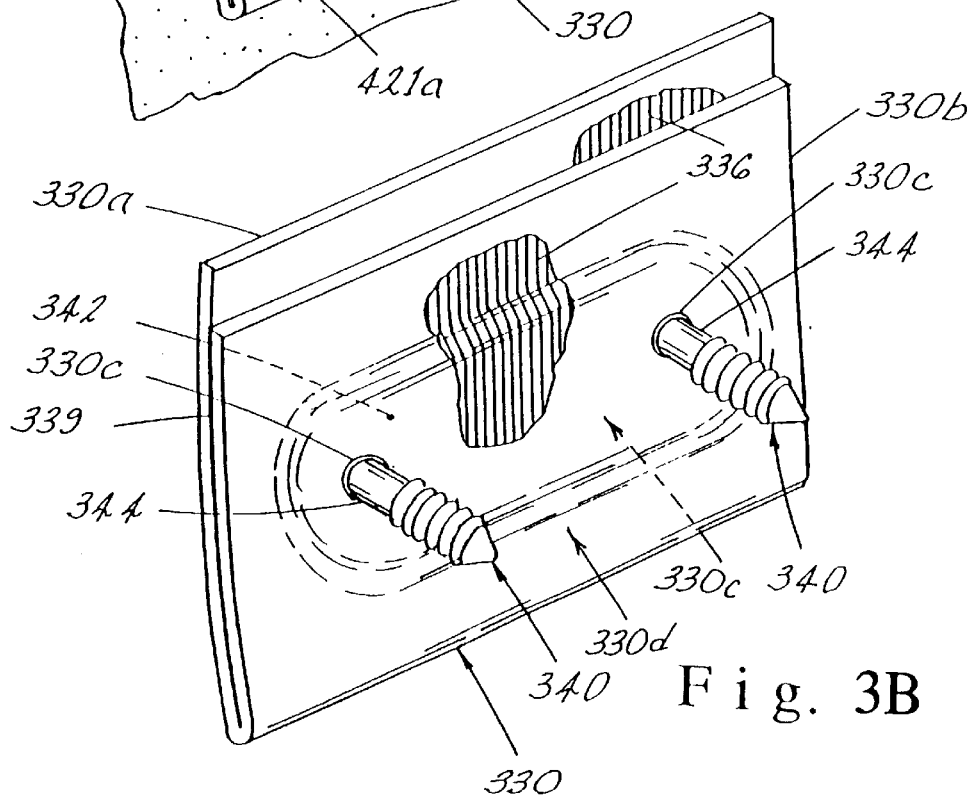
Fig. 3A
Fig. 3B

TIRE MODULE ATTACHMENT MOUNT

BACKGROUND OF THE INVENTION

This invention relates to vehicle tires, including spare tires, and more particularly to tires specifically designed to include modules for electronically monitoring tire performance and for other tire information. The invention is particularly useful for attaching the module to be supported near the interior surface of the tire.

With the increased use of electronics for recording, identification and monitoring devices used in vehicle tires the problem of incorporating these electronic modules within or upon the tire continues. Electronic chips or other generally rigid or semi-rigid devices have been made to monitor and/or record a number of tire parameters, as well as to identify and locate tires. These include manufacturing and inventory data, sales and distribution information, physical performance data, environmental engineering data and the like. Modules can store data to be updated, collect data for future evaluations and/or can be a read on demand device within the scope of this invention. Electronic modules can either have their own energy source or be activated by remote devices. In summary, electronic devices are known to generally provide whatever the user's needs may be. Some typical modules of the electronic type are disclosed in U.S. Pat. Nos. 4,862,486; 4,911,217; 5,218,861; and 5,573,610.

In general, modules are imbedded within a rubber component of the tire, inserted in an interior pocket, fixed to the tire's surface, attached to the rim supporting the tire, or mounted in the valve stem. The location of the module influences the ability to measure and store engineering performance parameters such as inflation pressure, tire temperatures, number of revolutions or stress cycles and the like. Modules having electronic components, such as chips and circuit boards, are generally rigid or semi-rigid modules which are placed in contact with a very flexible tire. Tire deformations, shock and vibrations of the tire can be relatively large and exist over the life of the tire for literally millions of cycles, and adversely affect the life and performance of the chip. A module imbedded or attached to the tire which is relatively rigid compared with the tire itself will not survive the deformations and shock to which it is subjected. A need exists to provide a generally rigid module for encasing a rigid monitor chip and isolating the module and chip from the flexible tire.

Typical fastener devices known in the industry are disclosed in U.S. Pat. Nos. 4,938,645; 5,468,108; and 5,718,025. An example of a typical rubber patch is the tire repair system manufactured by Tech International of Johnstown, Ohio.

The components or devices in the industry for accessing electronic information monitored and stored by an electronic module are generally not within the scope of this invention. In general, they involve some type of printed chip technology. Some devices are remote hand held devices while others are directly or indirectly connected to other monitoring equipment located within the vehicle. Slip ring devices allow information to be electronically transmitted directly from the rotating tire and wheel to the onboard monitoring equipment. Remote communication with the electronic module is generally by radio frequency (RF) sound waves. However, RF communication is made difficult by the use of metallic materials within and around the tire due to steel reinforcing members in the tire and a metallic rim plus metallic vehicle parts. A relatively large antenna is generally needed to improve RF communication between the electronic components of any module, especially for broadcasting data from the module within the tire to a standoff monitoring device.

As a result of communication difficulties, another need exists to locate a module as free from interference from tire and rim components as possible. For example, the steel components within the tire influence the ability to send and/or retrieve data. Typical location and communication problems and some solutions are disclosed in U.S. Pat. Nos. 3,873,965; 4,246,567; 5,181,975; and 5,573,611 as well as European Patent No. 0 639 472 A1. The need is to support a module in a location that will work with any data transmission means used to communicate data to and from an module placed within the tire.

Tire monitoring modules are known to have a life somewhat different than the life of the tire, being either longer or shorter. Energy sources, if any, wear out and the fatigue life of other components are not adequate in many cases resulting in a shorter life for the module. The module may also need to be removed for reprogramming, for updating tire information and/or for better data collection. In addition, it may be desirable to make changes or repair the electronic components within the module or replace the electronic module with an updated module. A removable monitoring module having a longer life than that of the tire within which it is mounted may also be used. The module can be reused in another tire when the tire containing a module is removed from service or the use of a module is no longer desired.

The need to add a monitoring module within an existing tire may be created. As "sensor or monitor ready" tires replace only some of the tires on a vehicle, it may be desirable to make the remaining tires sensor ready. The need is to have a method for placing a module in a tire as an aftermarket device. The method should not significantly change the tire or the processes of building and using the tire. This same method could be further used to relocate one or several modules at various locations or multiple locations within a tire to achieve better or different information. The modules can include electronic modules or other modules such as inventory control modules.

A need remains to improve the affixing of a module to the inside of a tire. Although the prior art already discloses several modules imbedded within or affixed to the surface area of a tire, these attachment means do not isolate the module from the deformations, shock and vibrations of the tire. Any means for communicating with the module is also made more difficult when a module is imbedded within or affixed to the tire's surfaces. In addition, the desired utility for relocating, replacing or reusing the electronic module is limited in the art. A further need remains to provide an attachment means which can be integrated within a tire either during the manufacturing process or after the tire is manufactured.

Accordingly, an object of the present invention is to provide a tire with a monitor apparatus having a retainer assembly for reliably retaining a monitor module on an interior surface of an operating vehicle tire.

Another object is to provide a tire with a monitor apparatus for mounting a generally rigid module to the inside of a tire in a manner to increase the life of the module and electronic components carried therein.

Another object of the invention is to provide a tire with a module mounted therein in which the module contains electronic components and the module is placed in an offset position from the tire's interior surface by an isolation mount for improved durability.

Another object of the present invention is to provide a tire with a retainer assembly that allows a module to be removed to be inspected, repaired and/or updated in hardware and/or stored data; as well as relocated to another tire or replaced by another module.

Yet another object of the present invention is to incorporate a monitor with electronic components within an existing tire to provide monitoring of tire information A further object of the present invention is to provide either a reinforced or unreinforced rubber ply within a tire for supporting a retainer assembly that receive, hold and support a module isolated to the inside of a tire.

Yet another object of the present invention is to allow the module to adjust itself while being retained within the tire by an isolation mount so that forces and deformations from the rolling tire are resisted and the fatigue life of the retainer assembly and the module is extended.

A still further object of the present invention is to provide a motion damping element for reducing movement and vibration of the monitor module to further extend the fatigue life of the monitor apparatus.

SUMMARY OF THE INVENTION

The above objectives are accomplished according to the present invention by providing a vehicle tire monitor apparatus and method wherein a module is carried adjacent the inside surface of the tire. The assembly includes a rubber ply affixed to the inside of the tire and a retainer assembly for securing a monitor module with the rubber ply within the tire. The vehicle tire monitor apparatus and method of this invention provides a cost effective and reliable means for incorporating a module within a tire. A further problem in the trucking industry is to provide a monitoring system that includes the module within the tire in a cost effective manner. The problem is further complicated by the need to have a monitoring module that does not require special handling of the tires or special training for tire changers and other maintenance personnel. The need to use generally standard maintenance methods and materials, such as rubber type patches and fastener devices is most desirable both from a personnel training point of view and in view of the overall cost of supporting a module. Ease of installing and removing the electronic module is desirable.

According to the present invention, a vehicle tire monitor apparatus is placed within a tire for monitoring tire information. Advantageously, a vehicle tire monitor apparatus comprises a rubber ply having a first side affixed to the interior surface of the tire at a predetermined location within a cavity of the tire. A module is carried by a second side of the rubber ply for containing electronic components which monitor the tire information. A retainer assembly may secure the module to the rubber ply in an offset position with respect to the rubber ply. The retainer assembly may include an isolation mount for mounting the module in the offset position to increase durability of the module and the rubber ply, and/or may include a motion damping element to reduce movement and vibrations when mounted and operating on the tire.

The retainer assembly of the invention preferably includes a first fastener part carried by the rubber ply and a second fastener part carried by the module which cooperate to securely fasten the module to the rubber ply. The isolation or standoff mount is provided by various aspects of the invention. For example, indexing or ratcheting elements may be provided on the first and second fastener parts to fix and space the module from the rubber ply within the tire.

Various other aspects of the invention are provided by various retainer assemblies having combinations of first and second fastener parts associated with the rubber ply and the module, The first fastener parts carried by the rubber ply contact second fastener parts of the module to correctly position the module within the tire's cavity.

In one aspect, the first fastener part includes a shaft supported by and extending from the rubber ply and a button retainer located at the remote end of the shaft. The second fastener part may include a retainer opening formed in the module having edge elements for frictionally receiving the first fastener part to position and retain the module within the tire's cavity. The module may include an entrance opening to initially receive the first fastener part and a transfer slot allowing movement of the shaft from the entrance opening to the retainer opening to support and retain the module during normal tire information monitoring by the electronic components within the module, whereby the module is removable from the tire.

In another aspect of the invention the first fastener part may include an elongated shaft received in a retainer opening of the module. The shaft has a length sufficient for the module to ride out on the shaft under centrifugal force and be retained by a retainer element at a desired distance from the ply. Alternatively, the standoff distance can be assured by the addition of a resilient stress absorbing resilient pad or element disposed between the second side of the rubber ply and the bottom surface of the module. The material of the stress absorbing element can be in the form of a sponge rubber layer or a resilient washer or spring around the shaft of a retainer element.

The invention includes a monitor ready tire and method for affixing a tire monitor to an interior surface of a vehicle tire. The method includes a first step of providing a rubber ply having first and second opposed sides. A second step includes forming a conditioned surface area on the interior surface of the tire. A third step includes affixing the first side of the rubber ply to the interior surface of the tire either before curing, during curing or after curing of the tire. The fourth step includes securing a module containing electronic components at a predetermined offset distance from the second side of the rubber ply for increasing durability of the module and the rubber ply. In a sixth step the method includes monitoring tire information during the life of the tire.

Further aspects of the method include providing releaseable first and second fastener parts for securing the module Forming a conditioned surface area further includes removing contaminants from the conditioned surface area on the inner surface of the tire to generally increase adherence of the rubber ply to the surface area.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3A is a perspective view of yet another embodiment of the tire monitor apparatus with a pair of shafts of a fastener device of the retainer assembly extending through retainer openings in the module to retain the module adjacent the folded reinforced rubber ply near the inner surface of the tire;

FIG. 3B is a perspective view of the embodiment of FIG. 3A showing the folded reinforced rubber ply retaining a base of the fastener device within a strap pocket for holding the fastener device in a position to extend the two shafts of the fastener device within the cavity of the tire to be in a position to receive the module;

FIG. 9A is cross-sectional view taken along line 9A—9A of FIG. 5A showing four layers of the rubber ply and a first fastener part formed to be integral with a third reinforced layer of the four layers, said first fastener part having a shaft with a button end portion that engages edges of retainer openings within the module;

FIG. 9B is cross-sectional view taken along line 9B—9B of FIG. 5A showing four layers of the rubber ply and a first fastener part, formed to be integral with a third reinforced layer of the four layers, said First fastener part having a shaft with a button end portion that engages edges of openings within the module;

DESCRIPTION OF PREFERRED EMBODIMENTS

Figure 1:
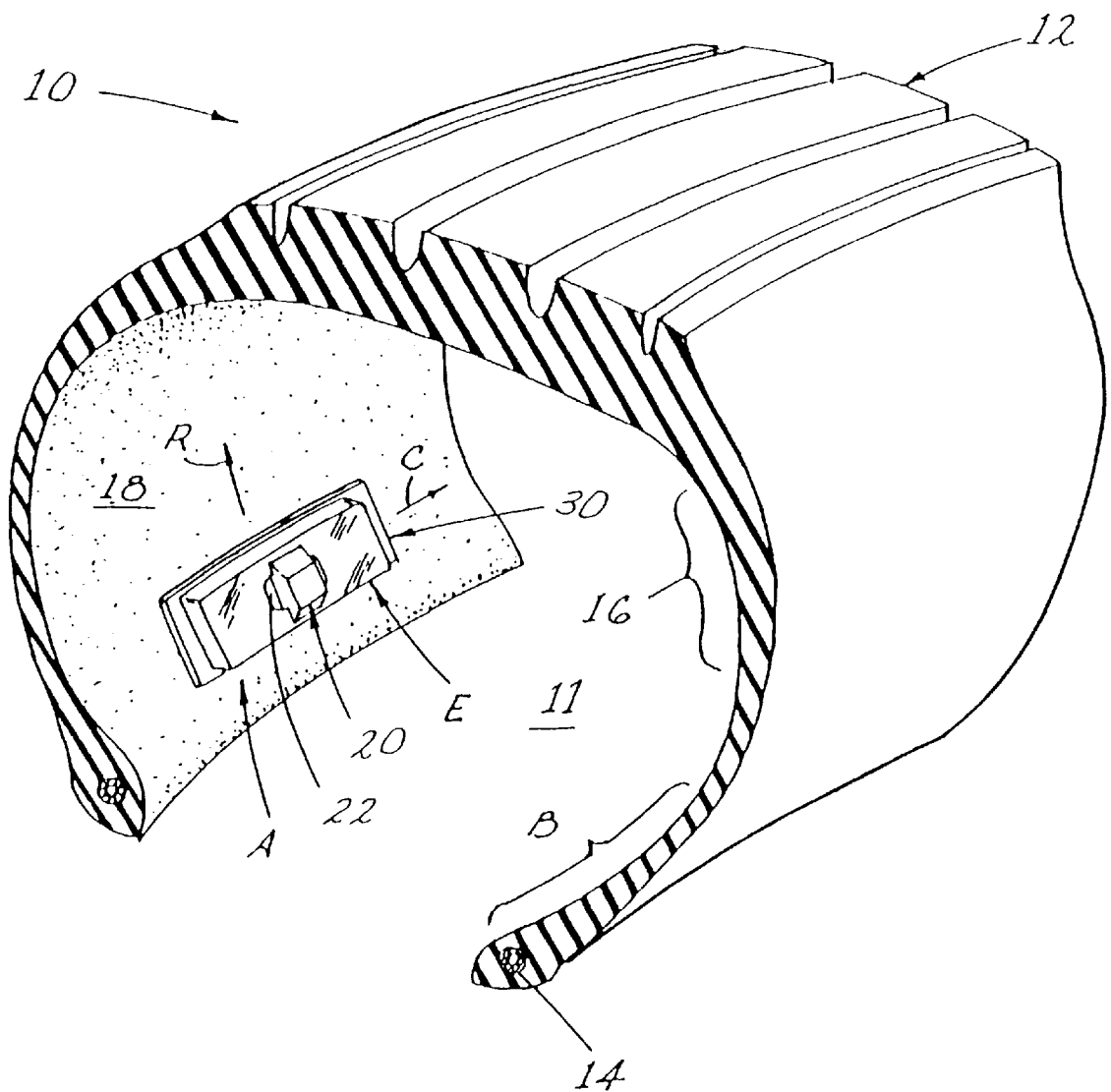
FIG. 1 is a perspective view of a tire section showing a tire monitor apparatus of this invention to include a module supported within an internal cavity of the tire.

Referring now to the drawings, the invention will be described in more detail. A segment of a monitored tire 10 for use on a vehicle and having a tread 12 for contacting a support surface is illustrated in FIG. 1. A module "E" which may have an electronic monitor for storing, monitoring and/or recording information about the tire, including its operating environment, is supported and retained within the tire to form vehicle tire monitor apparatus "A". Placing the module inside the tire makes it theft and tamper resistant and helps to keep it clean. According to the invention, module E is supported to the inside of the tire using a rubber ply 30 affixed to an inner surface 18 of the tire. The tire monitor apparatus includes a retainer assembly, designated generally as "G", for securing the module to the rubber ply in the cavity of the tire at an offset position generally away from the inner surface of the tire. A first fastener part 20 of the retainer assembly holds the module adjacent the rubber ply within the tire. Preferably, fastener part 20 of the retainer assembly holds the module at a predetermined "standoff" distance with respect to the rubber ply. In certain aspects of the invention, the module is provided with a retainer opening 22 as a second fastener part of the retainer assembly to help maintain the standoff distance.

A reinforced or an unreinforced rubber ply 30 can be used within the scope of this invention, with the preferred rubber ply being unreinforced. The amount of area in contact between tire inner surface 18 and a rubber ply of tire monitor apparatus A is selected to give adequate support to retain the module generally stationary with respect to the tire during the nominal operation of the vehicle tire. The mass and size of tire monitor apparatus A, including the module, determines the selection of the surface area of contact with the tire. The location of tire monitor apparatus A within the tire is also chosen to control the isolating effect of inertial forces, such as shock and other tire transmitted deformations, on the tire monitor apparatus, including the module. Inertial forces and bending deformations of the tire in the radial "R-direction" as well as the circumferential "C-direction" must be considered; as shown by R and C direction arrows in the figures. Bending perpendicular to the R-C plane must also be considered. The durability of the tire monitor apparatus is greatly enhanced by an isolation mount for isolating the module from tire transmitted deformations, vibrations, scrubbing and shock loads. The unique design of the present invention provides the isolation type mount for mounting the module. The illustration of FIG. 1 shows a retainer opening 22 in the module as a second fastener part of the retainer assembly for holding the module adjacent to the rubber ply.

The tire monitor apparatus or monitored vehicle tire and method of this invention can be affixed at any location to the inner surface of the tire. The preferred location is adjacent the bead area "B" of the tire, as illustrated in FIG. 1. This location generally has less tire deformation, shock and vibrations and is at a location somewhat easier for monitoring tire information available through the electronic components of the module; as well as being convenient for installing and removing the module. The bead area is also an area where the inside surface of the tire will deform to a lesser extent so that scrubbing of the inside surface on the module is less likely. Sidewall area 16 can also be a practical area for locating the module. In addition, the location in the tire for receiving the rubber ply must be convenient so that a surface area can be conditioned to provide complete adherence with the rubber ply.

Alternative illustrated embodiments of the invention are disclosed to allow for different modules, tire sizes, vehicle uses or environmental conditions as well as economic factors. For example, one application of the monitoring system is to provide a means to read tire pressures when a truck type vehicle drives past a stationary transponder device placed near a roadway. The monitoring system must transmit information from all tires including the remotely-located inside dual tires. Therefore, the design and placement of the tire monitor apparatus within the tire can be determined to provide efficient monitoring of tire information.

The actual makeup of the electronic components in the module can be for any intended application in managing the type and amount of desired information. Placing the module inside the tire makes it theft and tamper resistant and keeps it relatively clean. In addition, the means used to access information electronically from or to the components of a module is not critical to the scope of this invention. Any means including hardware components and software appropriate for the intended utilization of the module is within the scope of this invention. A further desirable feature in meeting the object of this invention is realized by being able to remove the module from the tire when desired for updating, replacing or repairing the electronic components of the module. The embodiments of this invention allow the module to be removed from the tire. However, removal is not an essential feature of the present invention if the user wishes to keep the module within the tire during the life of the module. Removal may be required, however, if a truck tire is to be recapped from time to time as the module and the electronic components may be damaged during the retreading process.

Figure 2A:
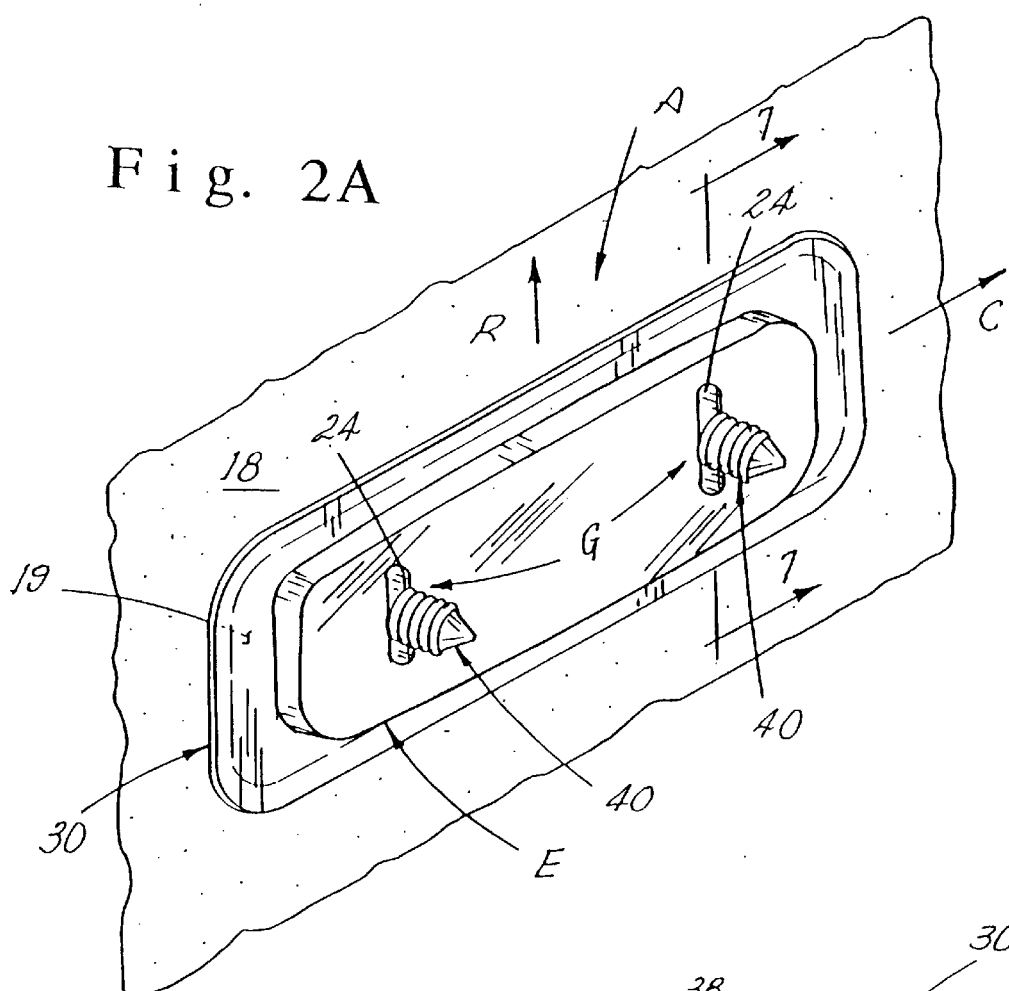
FIG. 2A is a perspective view of one embodiment of the tire monitor apparatus of the present invention with a retainer assembly having a pair of fastener devices holding the module adjacent a rubber ply near an interior surface of the tire.
Figure 2B:
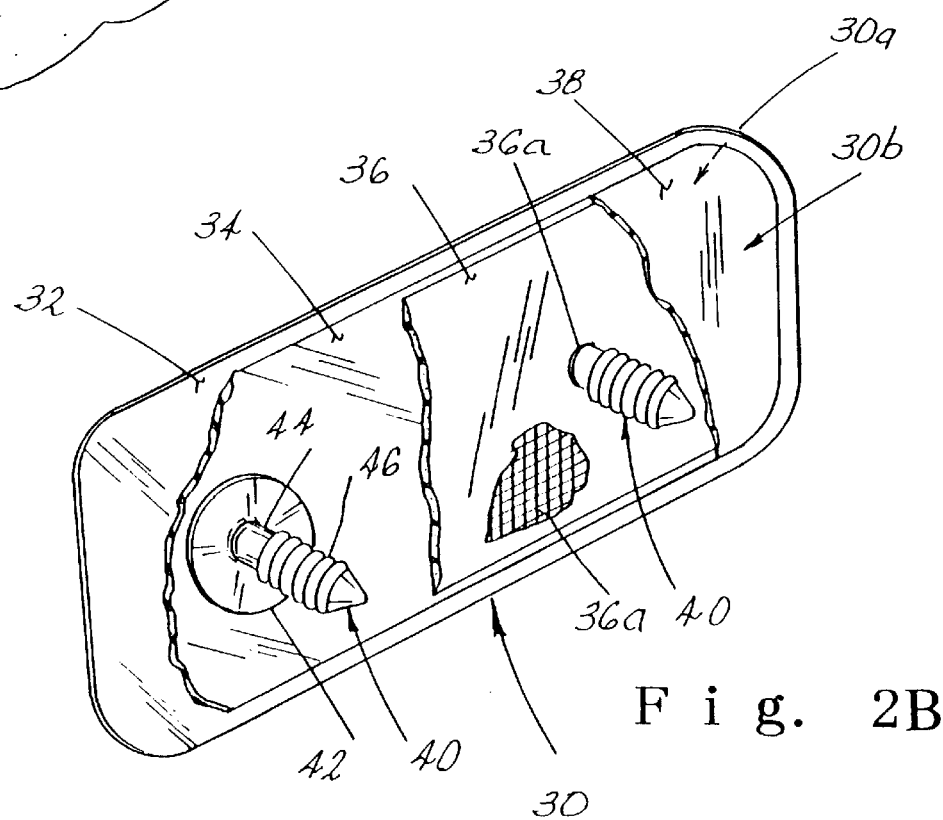
FIG. 2B is an perspective view of the retainer assembly of the invention showing break away portions of the rubber ply with four rubber layers carrying two fasteners positioned to extend into the tire's cavity and with reinforcing members formed integral with one rubber layer according to an aspect of the invention of FIG. 2A.

The tire monitor apparatus illustrated in FIGS. 2A and 2B includes rubber ply 30 having a first side 30a that coexists with the inner surface of the tire at an interface 19 and a second side 30b exposed to a cavity 11 of the tire 10 (see FIG. 1). The first layer is referred to as a sticky mix layer. This non-reinforced layer can be adhesively affixed to the tire when using a chemically cured rubber compound. The rubber ply can also be affixed using a "cure-in" type patch which cures chemically rather than with heat and pressure. A third layer 36 provides adequate strength by including reinforcing members 36a extending in both the radial R-direction and the circumferential C-direction. The third layer is referred to as a reinforcing layer. An optional second layer 34 is placed between the first and third layers to generally provide a transition between the strains from the inside surface of the tire itself to the strains of the reinforced rubber ply. An optional fourth layer 38 covers layers two and three. The fourth layer is referred to as a covering layer that forms inner second side 30b of the rubber ply.

Rubber materials used for rubber layers 32–38 are those commonly used in the industry for sticky-mix, bonding, reinforcing and covering layers. For example, a typical four layer rubber patch is the "tire repair systems" (catalog no. 169) as manufactured by Tech Industries of Johnstown, Ohio. In one aspect, the rubber ply may include four layers integrally formed to make a reinforced rubber ply. A first layer 32 extends radially and circumferentially outward of the other layers and is a rubber compound to provide a first surface of the rubber ply that adheres very well to inner surface 18 of the tire at a supporting interface 19. A retainer assembly G holds module E on rubber ply 30, as illustrated in FIG. 2A for this embodiment of the invention. Rubber ply 30 has its first side 30a affixed to the inner surface 18 of the tire at a support interface 19.

In the illustrated embodiment of FIG. 2B, there are a pair of first fastener parts 40 having a base 42 imbedded between the second layer 34 and the third reinforced layer 36 of the rubber ply 30. Each first fastener part 40 has a shaft 44 that extends from base 42 at second side 30b of the rubber ply with standoff, indexing or ratchet elements 46 at the other end of the shaft Shaft 44 extends through openings 36a in reinforced layer 36 as well as coexisting openings in cover layer 38.

Module E may include a second fastener part in the form of a pair of retainer openings 24, as illustrated in FIG. 2A. The module is supported from the reinforced rubber ply by passing fastener shafts 44 through retainer openings 24 in the module. The retainer openings have edge elements which make the openings smaller than the outer dimension of standoff elements 46 so that the standoff elements engage the edge elements of the retainer openings and hold the module supported by the reinforced rubber ply. The retainer openings are elongated for providing for easy installation of the module and to allow the module to slightly adjust its position relative to the reinforced rubber ply during running of the vehicle. This adjustment relieves stresses on the tire monitor apparatus. The fastener part 40 can be made of any material commonly used for fasteners, but is preferably made of a plastic material such as a nylon or a molded rubber. Alternatively, standoff or edge elements may be placed on the second fastener part to engage the first fastener part.

Figure 7:
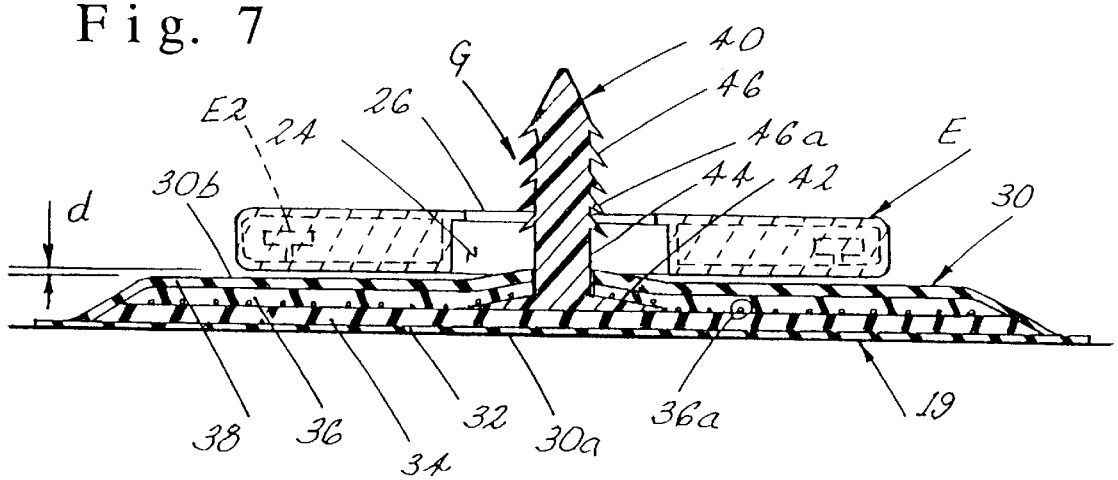
FIG. 7 is cross-sectional view taken along line 7—7 of FIG. 2A showing four layers of a reinforced rubber ply, a retainer assembly having a first fastener part with a base positioned between second and third layers of the reinforced rubber ply and a shaft extending from the base having standoff, indexing or ratchet elements that engage second fastener parts of the module.

Describing in more detail one aspect of providing and isolation mount by retainer assembly G of the invention, reference is made to the cross-sectional drawing of FIGS. 7, which is a section taken along line 7—7 of FIG. 2A. Rubber ply 30 has a first side 30a attached to the inner surface of the tire at an interface 19. Shaft 44 of the first fastener part extends outward through third and fourth layers 36 and 38 of the rubber ply. Module retainer opening 24 receives shaft 44. The isolation mount is provided by standoff, indexing or ratchet elements 46 that engage the second fastener part edges 26 within the retainer opening of the module E, when the module is mounted. The module is forced to be near the second side of the rubber ply. When the module E with its electronic components (i.e. E2) is installed, one of the standoff elements 46a is in a position to contact edge element 26 and hold the module in an optimum position with respect to the rubber ply. After being installed, the module has a desired offset distance "d" from rubber ply 30. This position being one to provide proper operation of the module and an extended service life for the vehicle tire monitor assembly.

In the illustrated embodiment of FIGS. 3A and 3B a retainer assembly G includes a first fastener part 340 carried by a folded reinforced rubber ply 330. The fastener part includes a common base 342 having two shafts 344 extending from the common base. The reinforced rubber ply is folded to embed the base between a first layer 330a and a second layer 330b of the folded reinforced rubber ply at an interface 339 between the layers. The layers are bonded together at the interface where possible and are bonded to the common base of the fasteners. Openings 330c in the second layer are provided for shafts 344 to extend from the folded reinforced rubber ply. As before, folded reinforced rubber ply 330 is affixed at a first side 330c to the inner surface 18 of the tire at a support interface 19. A second complementary fastener part carried by module E includes retainer openings 424 provided in the module, as illustrated in FIG. 3A. Shafts 344 extend through the retainer openings into the cavity of the tire and have standoff, indexing or ratchet elements to engage edge elements of the retainer openings and hold module E in an offset position with respect to the folded reinforced rubber ply 330 within the cavity of the tire. Once again, retainer assembly G provides for adjustments in the offset position of the module relative to a second side 330d of the folded reinforced rubber ply so that varying offset distances may be provided. A preferred offset distance has a value in a range of about 1 to about 5 millimeters. Alternatively, a zero offset distance can be provided when durability of the tire monitor apparatus has been verified.

The first fastener part of the retainer assembly can be made of any material commonly used for fasteners, but is preferably made of a plastic material such as nylon or a molded rubber. A typical nylon shaft with ratchet type indexing elements is catalog number PC47486 made by TRW, Inc. of Lyndhurst, Ohio.

Figure 4A:
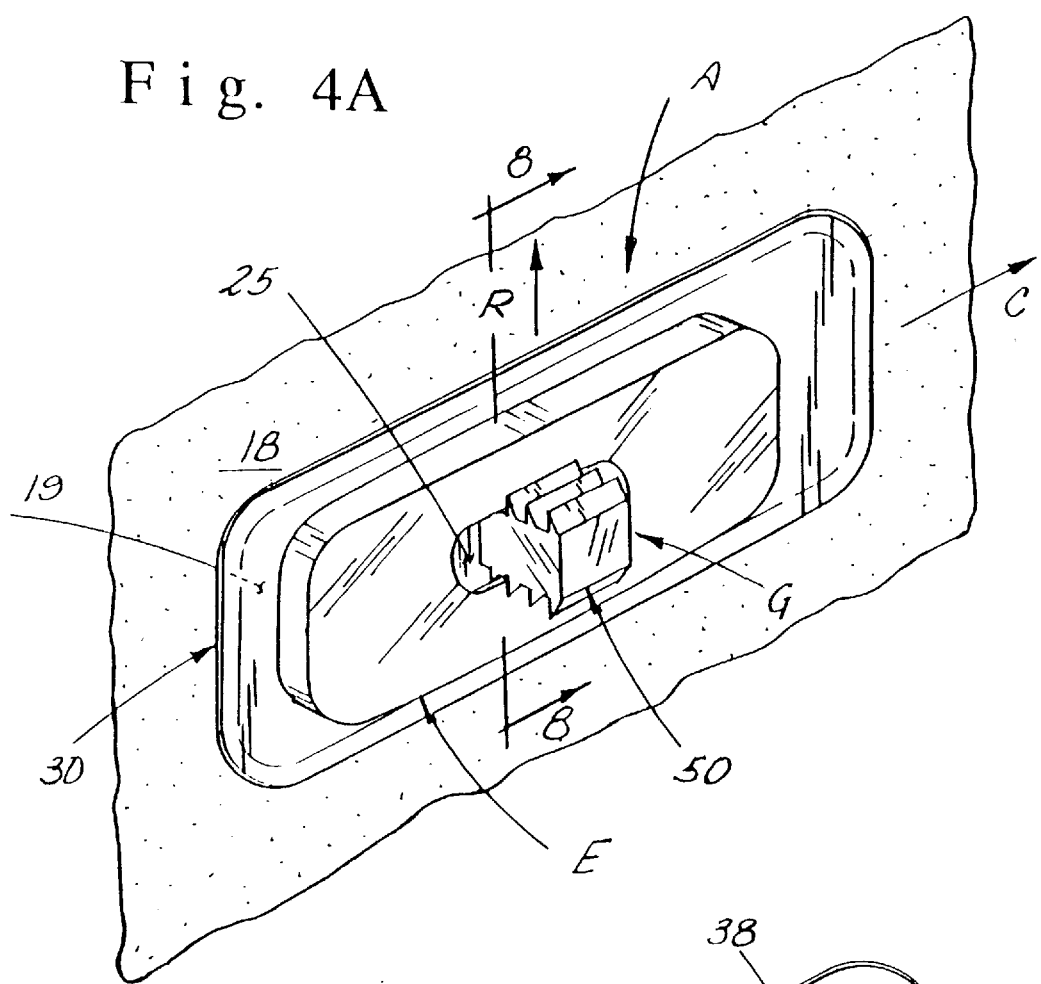
FIG. 4A is a perspective view of another embodiment of the tire monitor apparatus of the present invention with a single larger fastener device of the retainer assembly holding the module adjacent a rubber ply affixed to the inner surface of the tire.
Figure 4B:
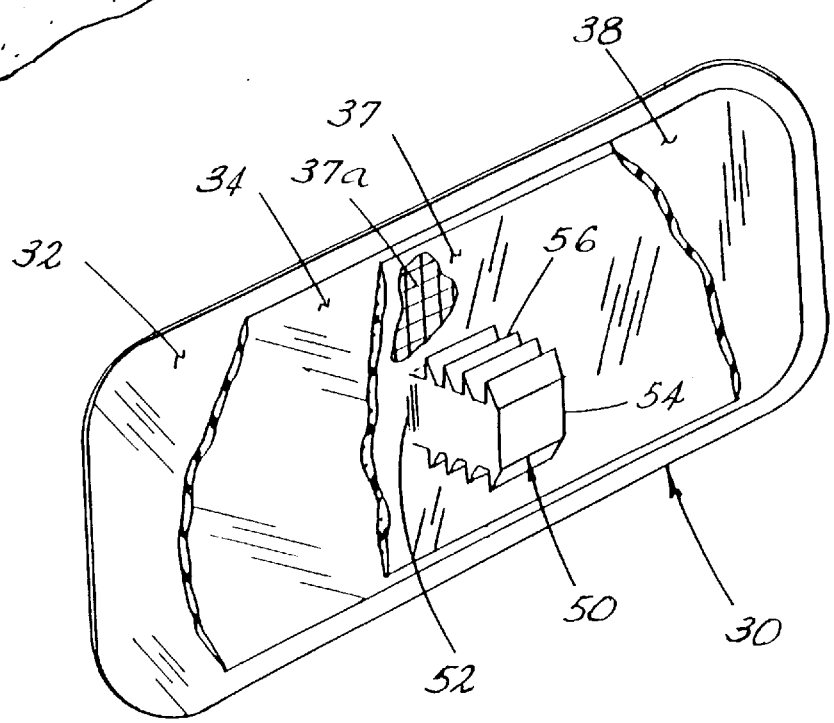
FIG. 4B is a perspective view of the embodiment of the rubber ply and a retainer assembly of FIG. 4A showing break away portions of a four layer rubber ply and the single fastener device made integral with one layer and positioned to extend into the tire's cavity and further with reinforcing members formed integral with the one rubber layer and the fastener device.

According to further illustrated embodiments of the invention, tire monitor apparatus A includes providing a similar rubber ply as previously described and a retainer assembly G which includes a first fastener part 50, as illustrated in FIGS. 4A and 4B. A conditioned surface area is provided on the inner surface 18 of the tire for attaching the first side of the reinforced rubber ply 30 to the inner surface at interface 19. The module E is preferably aligned with the radial R-direction and the circumferential C-direction of the tire. The longer dimension of the module is preferably aligned with the C-direction to avoid large tire deformations. The reinforced rubber ply may again have four layers, or two layers in another aspect. First layer 32, second layer 34 and fourth layer 38 are essentially the same as described above. A third layer 37 is provided with reinforcing members 37a. This reinforcing layer 37 is shown in FIG. 4B as being formed as an integral part with a first fastener part 50. Alternatively, the third layer can be unreinforced within the scope of this invention. The fastener part has a shaft 54 carried by and formed with third layer 37 and extending from the second side of the rubber ply into the cavity of the tire from its base 52. The shaft includes standoff, indexing or ratchet elements 56 along two outer sides of the shaft to engage second fastener parts being edges of retainer opening 25 of the module. Fastener part 50 may be rectangular in shape. Other shapes such as round, oval, elliptical, polygonal and the like are within the scope of this invention.

Figure 8:
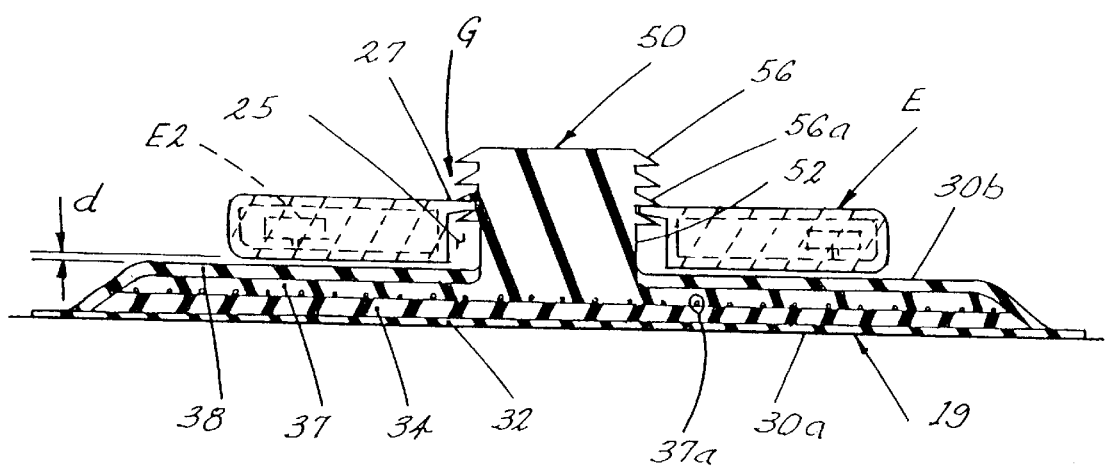
FIG. 8 is cross-sectional view taken along line 8—8 of FIG. 4A showing four layers of a rubber ply, a fastener device formed to be integral with a third reinforced layer of the rubber ply and a shaft of the first fastener part with standoff elements that engage second fastener parts of the module.

FIG. 8 is a cross-sectional view is taken along line 8—8 of FIG. 4A. Rubber ply 30 has a first side 30a affixed to the inner surface 18 of the tire at an interface 19. Fastener part 50 is uniquely made to be an integral part of third layer 37 of ply 30, and includes reinforcing members 37a. Shaft 54 of fastener part 50 extends outward through fourth layer 38 of ply 30 from a base of the shaft. Module retainer opening 25 receives the shaft. Shaft 54 has standoff, indexing or ratchet elements 56 at its outer end that engage edge 27 of the retainer opening. When the module with its electrical components (i.e. E2) is installed in its preferred location, one of the standoff elements 56a is in a position to contact at least one edge 27 of the module and hold the module in an optimum position with respect to the reinforced rubber ply. After being installed, the module, once again, has a preferred location offset distance "d" from the second side 30b of rubber ply 30. This position and distance being a predetermined placement to provide proper operation of the module and an extended service life for the tire monitor apparatus. In another aspect of the invention, an isolation mount may be provided by standoff elements placed on the second fastener part to engage the first fastener part.

In the illustrated embodiment of FIGS. 4A and 8, module E has a single retainer opening 25 to accommodate single fastener shaft 50. Edges 25a of the retainer opening provide second fastener parts with an opening width dimension less than the outer dimensions of the shaft 54 when indexing elements 56 are included. The difference in these dimensions allows a friction fit between fastener part 50 and the opening edge to retain the module supported by rubber ply 30. The retainer opening may be elongated in one direction to provide for easy installation of the module and to allow for adjustments in the position of the module relative to the rubber ply during running of the vehicle. Multiple retainer openings and fastener parts of the type illustrated in this embodiment of the invention may also be utilized. However, the use of a single shaft has been found highly advantageous.

Figure 5A:
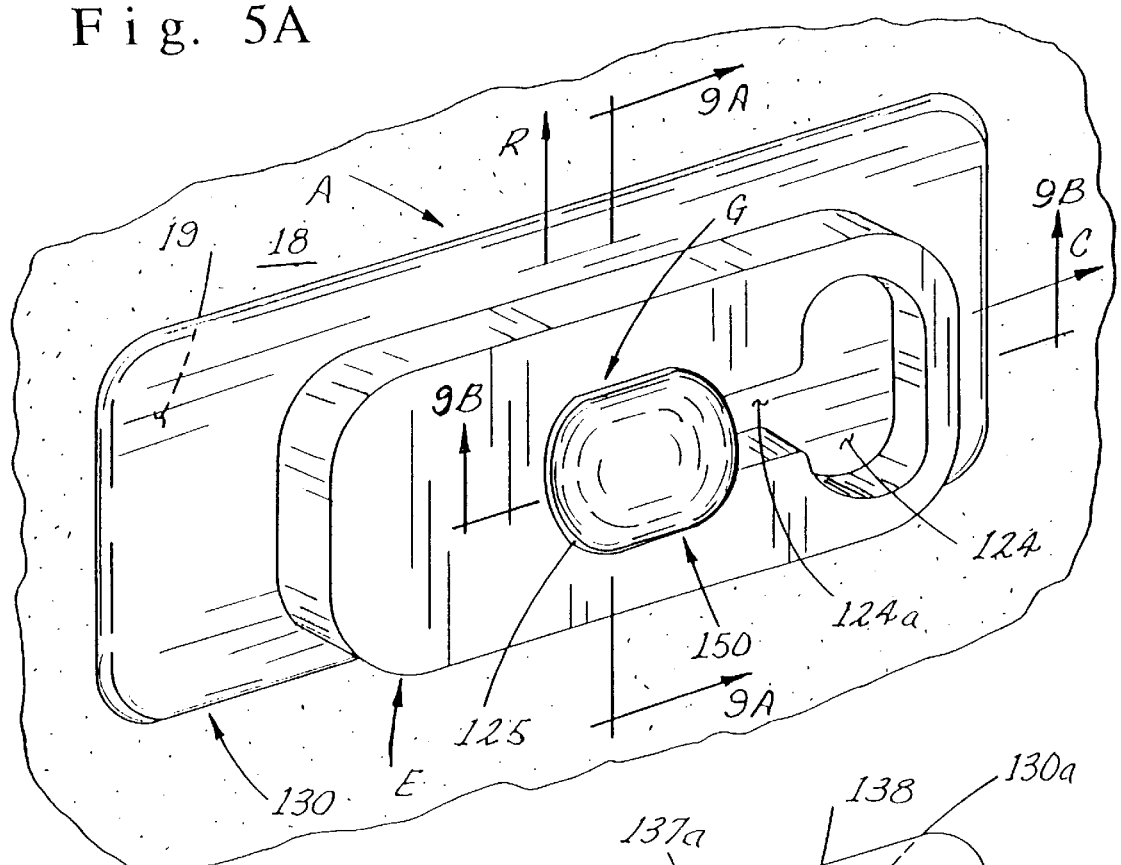
FIG. 5A is a perspective view of another embodiment of the tire monitor apparatus of the present invention with another single fastener device of the retainer assembly holding the module adjacent a rubber ply affixed to the inner surface of the tire.
Figure 5B:
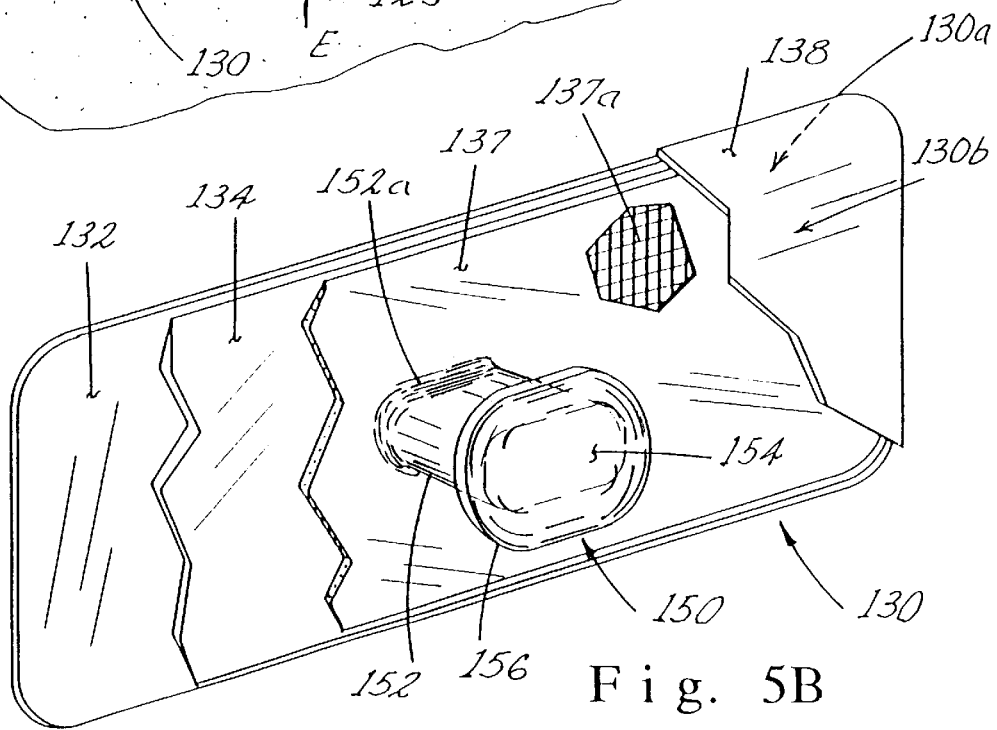
FIG. 5B is a perspective view of the other embodiment of the rubber ply and a retainer assembly of FIG. 5A showing break away portions of a four layer rubber ply including a reinforced layer and the other fastener device made integral with the reinforced layer to extend into the tire's cavity.
Figure 10:
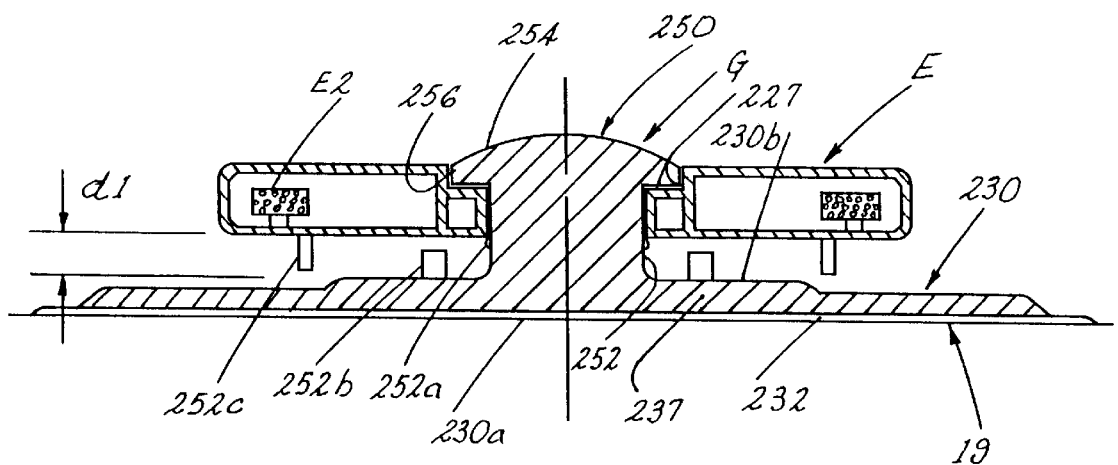
FIG. 10 is a cross-sectional view of a rubber ply having two unreinforced layers formed integral with a fastener device of the retainer assembly for holding the module by engaging edges of retainer openings within the module.

According to the illustrated embodiment of FIGS. 5A and 5B, tire monitor apparatus A includes a rubber ply 130 and a retainer assembly G having a first fastener part 150 carried by the rubber ply. The ply and fastener part are preferably integrally molded. There is a conditioned surface area on the inner surface 18 of the tire to which a first side 130a of rubber ply 130 is affixed at interface 19 such that module E is generally aligned with the radial R-direction and the circumferential C-direction of the tire. The reinforced rubber ply again has at least two layers, i.e. a sticky-mix layer and a rubber layer. For the four layer rubber ply, a first sticky-mix layer 132, a second bonding layer 134, a third reinforced layer 137 and a fourth covering layer 138 are essentially the same as described above. The third layer 137 can be provided with reinforcing members 137a. For the two layer rubber ply, second and fourth layers can be removed and the third layer can be made with reinforcing members or without reinforcing members. These options are discussed in more detail below when discussing the cross-sections of FIGS. 9A, 9B and 10. The layer 137 can be formed as an integral part with fastener part 150, as illustrated in FIGS. 5B and 10.

Figure 6A:
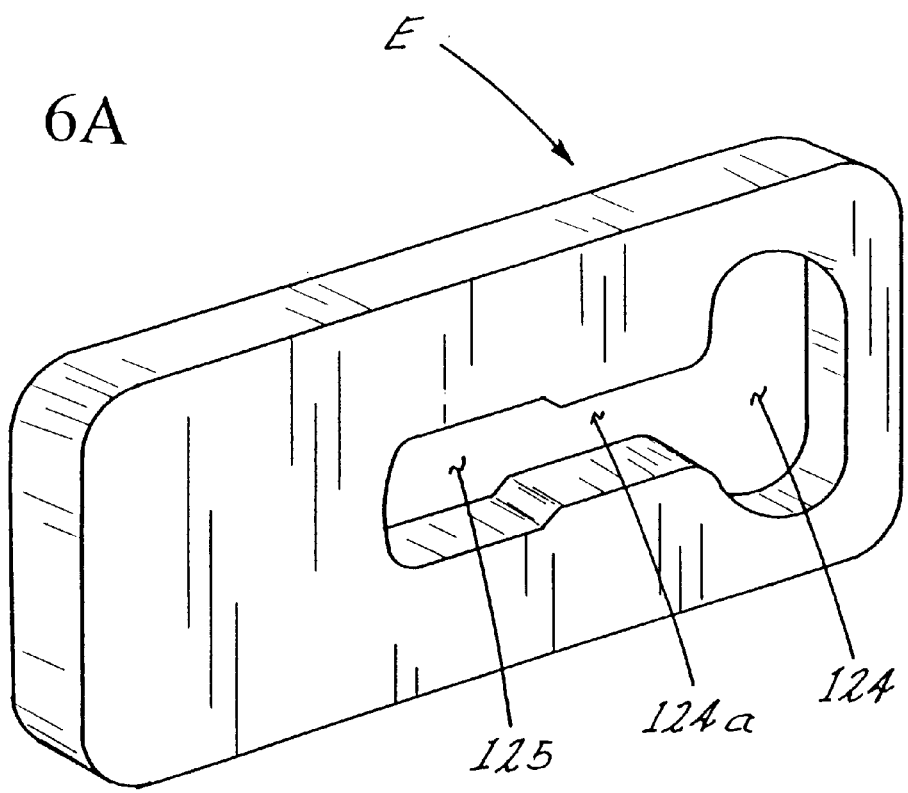
FIG. 6A is a perspective view of a module having second fastener parts including a retainer opening, a entrance opening and a transfer slot communicating the entrance opening with the retainer opening for receiving and retaining a first fastener part of the fastener elements.
Figure 6B:
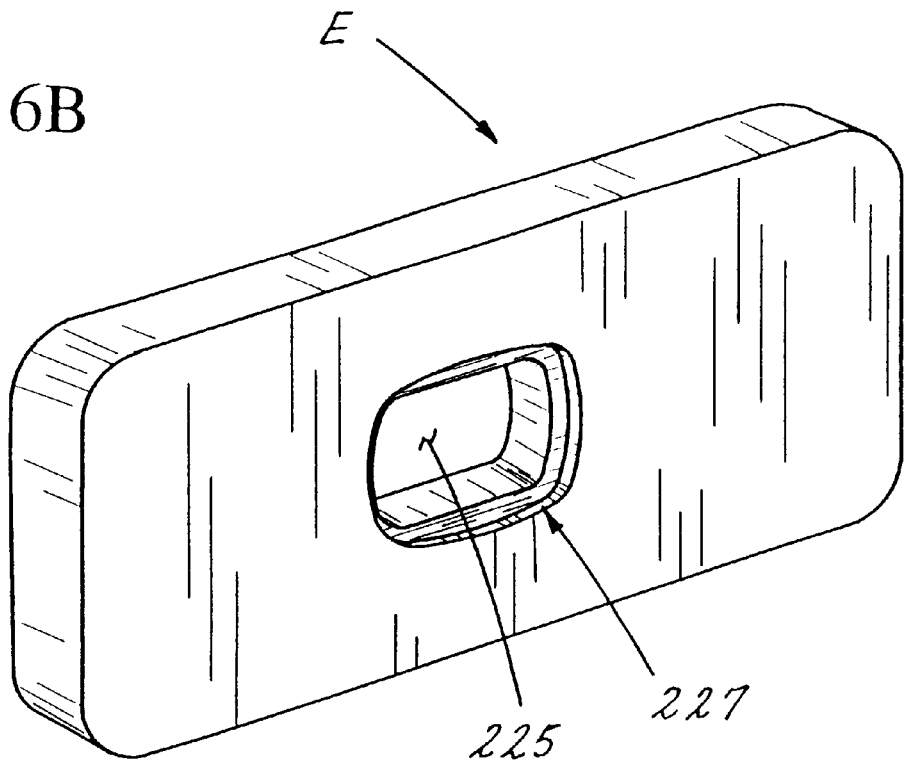
FIG. 6B is a perspective view of a module having second fastener parts including a retainer opening and edge elements for receiving and retaining a shaft and a button of a first fastener part of the fastener elements.

Fastener part 150 has a shaft 152 extending into the cavity of the tire from the second side 130b of rubber ply. The shaft contains a retainer element or button 154 with optional flat sides 156 that engage second fastener parts within a retainer opening 125 of module E, as illustrated in FIGS. 5A and 6A. The first fastener part is shown to be oval in shape. Other shapes such as round, rectangular, elliptical, polygonal and the like are within the scope of this invention. Module E preferably has an entrance opening 124 to initially receive first fastener part 150, as illustrated in FIG. 5A. A transfer slot 124a between entrance and retainer openings 124 and 125 provides for installing the module in an installed position as illustrated in FIGS. 5A and 6A. Installing the module places it in a position to be supported by retainer assembly G from the rubber ply. The module is initially turned 90 degrees from its installed position and button 154 is forced through the first opening 124. A lubricant can be placed on the button and shaft to assist in installing the module. The module is then turned to its installed orientation and the shaft of the first fastener part is forced through slot 124a into second retainer entrance opening 125 into a friction fit. Retainer opening 125 can be made with edge elements that interface with first fastener part 150, including flat sides 156, and hold the module in a predetermined orientation with respect to the cavity of the tire. The retainer opening is made to be elongated in one direction to provide for easy installation of the module and to hold the module in a properly installed orientation relative to the rubber ply. Reversing the above procedure allows the module to be removed from the tire.

Figures 9A, 9B:
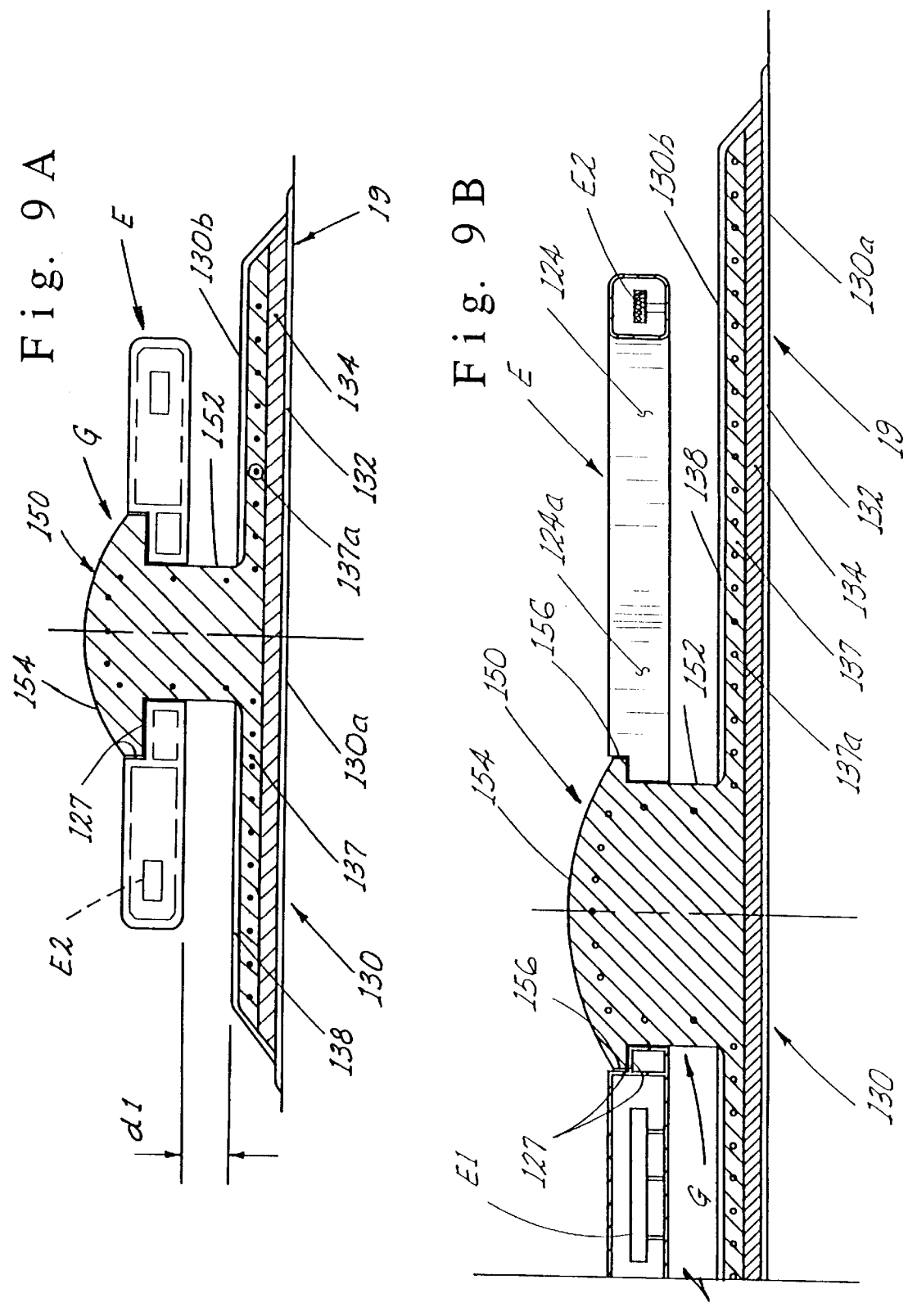

In an advantageous aspect of the invention, shaft 152 may be a sufficient length so that module E may be forced outward along shaft 152 to achieve a desired offset distance "d1" from the second side 130b of the rubber ply (FIG. 9A). For this purpose, at least one isolation mount in the form of standoff, indexing or ratchet elements may be formed on shaft 152 to place the module at the desired offset distance from second side 130b of the rubber ply. In another aspect, centrifugal forces on module E may be utilized to maintain the module in an offset position from ply 130 and the tire. In addition, shaft 152 may be tapered to bias the module toward the button. In another aspect of the invention, an isolation mount may be provided by standoff elements extending from second fastener part 127 to engage first fastener part 150.

Other variations and features of standoff retainer assembly G are illustrated in the sectional views of FIGS. 9A and 9B. Respective sectional views are taken along line 9A—9A and line 9B—9B of FIG. 5A. Rubber ply 130 has a first side 130a attached to the inner surface 18 of the tire at an interface 19. Fastener part 150 is uniquely made to be an integral part of the third layer 137 having reinforcing members 137a which extend into the stem and button parts of the fastener device. A shaft 152 of the first fastener part extends outward through fourth layer 138. Module retainer opening 125 receives the shaft of the fastener. The shaft 152 has retainer element or button 154 at its outer end with sides 156 that engage edges 127 of retainer opening 125 of module E, when the module with electrical components (i.e. E1 and E2 ) is installed in its preferred location. Edges 127 can be recessed so that button 154 can be visually aligned and fixed with the module when properly installed. After being installed, the module has a preferred location with a relatively large offset distance "d1" from rubber ply 130. The button 154 is in a position to contact edge or edges 127 of the module and hold the module in an optimum position with respect to reinforced rubber ply 130. This position, once again, being a placement to provide proper operation of the module and an extended service life for the monitor apparatus. The offset distance has a value between about one (1) millimeter and about five (5) millimeters. The preferred offset distance is about three (3) millimeters.

In FIG. 9B, entrance opening 124 receives button 154 and shaft 152 of fastener part 150. The shaft is forced through the transfer slot 124a so that sides 156 of button 154 contact recessed edges 127 of the retainer opening 125, as previously described. The seating of the button in the recess of the retainer opening provides an offset mount and distance between the rubber ply and the module which can be maintained by centrifugal force of the rotating tire.

As noted earlier, the rubber ply can be made with only two layers. Depending on the rubber compounds used to make each ply and the magnitude of the tire deformations, vibrations and shock during normal running of the tire, certain layers of the four layer rubber ply become optional when providing a rubber ply. Generally speaking, the second and fourth layers of the rubber ply, as illustrated in FIGS. 9A and 9B, are optional layers. For example, the rubber plies 230 and 430 of FIG. 10 and 11 respectively are made with two plies. The first rubber layer 232, 432 is the sticky-mix layer providing a first side 230a, 430a for improved attachment of the rubber ply to the inner surface of the tire. There is no second layer and a third rubber layer is a main support layer 237, 437 for the shaft 252, 452 of the first fastener part 250, 450. The preferred main support layer is compounded to have the size and strength to resist the environmental forces, such as shock, vibrations and tire surface area deformations associated with supporting the tire monitor without the addition of reinforcing members. However, reinforcing members can be provided when necessary. The third layer can be made of a material to allow the optional fourth or cover layer to also be removed. The shaft is made to be integral with main support layer 237, 437 of the rubber ply and has a length to extend into the cavity of the tire.

In a further aspect of the invention, the isolation mount can be provided in the form of protrusions from the rubber ply and/or the module, as illustrated in FIG. 10. A plurality of generally resilient nibs or bumps 252b, 252c carried by either the rubber ply 230 or the module E insure an offset position with an offset distance between the rubber ply and the module greater than a predetermined minimum value. The desired offset distance "d1" being somewhat larger than the minimum value when the outer end of the nibs make contact. The module is retained by a retainer assembly G including the contact between the first fastener part 250 and the second fastener part 227, as previously described. The nibs provide the isolation mount for insuring the offset position first an with when the may be somewhat less than offset distance. In another aspect, resilient nibs or bumps 252a may be added to the shaft 252 of the first fastener part to hold the module in the offset position. The offset distance has a value in the range of about one millimeter to about five millimeters, with three millimeters being preferred.

Figure 11:
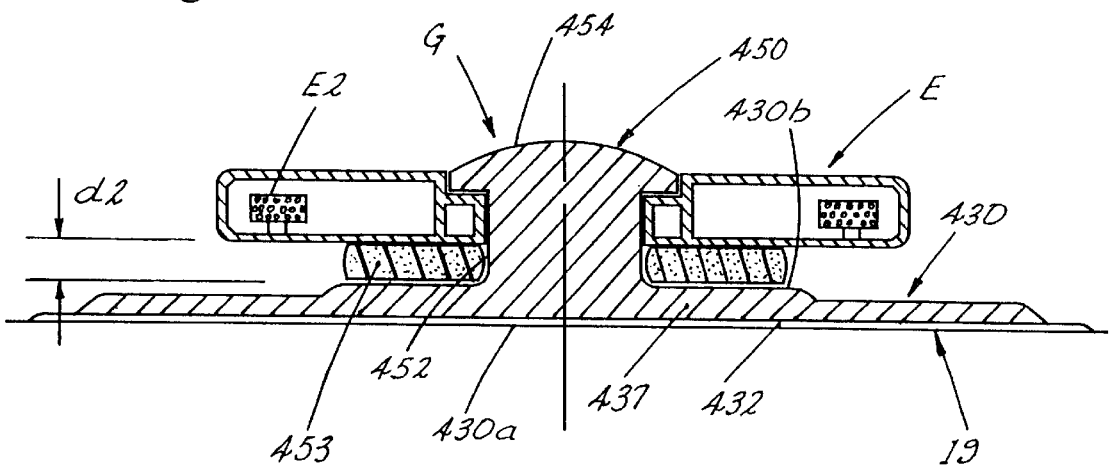

In another aspect of the invention, the standoff distance "d2" can be assured by an isolation mount including the addition of a resilient isolating material placed between the second side of rubber ply 430 and the bottom surface of the module E, as illustrated in FIG. 11. For example, the isolation mount material can be in the form of a sponge rubber layer or a flexible washer placed around a shaft 452 of a first fastener part 450 of retainer assembly G. Generally speaking, the isolation mount can include any element placed between the rubber ply and the module that improves the durability of the tire monitor apparatus. For example, a coil spring placed around the shaft of the first fastener part between the rubber ply and the module will help provide the desired offset distance without degrading the durability of the assembly.

Referring now to FIGS. 13–19, another embodiment of the invention will be described. As can best be seen in FIG. 13, vehicle tire monitor apparatus, designated generally as H, is illustrated as including a rubber ply 500 onto which is affixed a monitor module 502 which may contain an electronic package for monitoring the tire information during operation. Rubber ply 500 is affixed to the tire as described previously in relation to vehicle tire monitor apparatus A. However, in this embodiment, a motion damping element is provided for reducing the movement and vibrations of the module monitor during vehicle operation. In the illustrated embodiment of FIGS. 13–19, as can best be seen in FIG. 15, a module retainer assembly is illustrated for securing the monitor module to the rubber ply which includes a stem 504 carried by rubber ply 500 which terminates in a remote end having a retainer button 506. Also carried by rubber ply 500 is an isolation mount which includes a plurality of isolation elements 508. In addition, there is a motion damping element illustrated in the form of a resilient protuberance 510, whose function will be described later. Basically, stem 504, retainer button 506, isolation elements 508, and motion damping element 510 are molded as one piece with rubber ply 500. Referring now to monitor module 502, as can best be seen in FIG. 16, there is an entrance 512, defined by at least one sidewall 512a that defines an opening 512b for receiving the stem and retainer button. A guide slot 514 is formed in the module which tapers inwardly towards a retention slot 516. Retention slot 516 is also defined by at least one sidewall 516a. It is noted that the cross-section of stem 504 and retention slot 516 are generally the same so that at a tight friction fit is provided between the elements. It is also noted that the shape of tapering guide slot 514 makes it easier for the stem to slide to the retention slot than it is for the stem to be removed from the retention slot. For this purpose, sharp edges 514a may be formed at the end of guide slot 514 to engage the stem in the removal direction to further inhibit its removal. This assures integrity in the affixation method. In essence, a keyway is provided by entrance 512, retention slot 516, and guide slot 514 wherein stem 504 locks in retention slot 516 and damping element 510 locks in entrance 512. A conventional lubricant can be used to assist the movement of stem 504 from the entrance 512 through the guide slot 514 to the retention slot 516. The preferred lubricant is one which dries to form a sticky interface between the stem 504 and the side surfaces 516a of the retention slot.

Retainer button 506 is larger than the opening of retention slot 516 so that the outward movement of monitor module 502 is limited by the retainer button. The axial length of stem 504 is sufficient so that when module 502 is retained on the stem, resilient isolation elements 518 maintain module 502 at an offset distance "d" from the rubber ply, as can best be seen in FIGS. 18 and 19. Typically, the resilient elements will be deformed downwardly so that module 502 rests upon the bend portion of the resilient elements, indicated at 508a. As can best be seen in FIGS. 14 and 17, motion damping element 510 is received in entrance opening 512b when stem 504 is located in retention slot 516. The width dimension of motion damping element 510 is generally equal to the width of entrance opening 512b so that engagement between the damping element and the sidewall reduces any movement or vibrations of monitor module 502 as retained on rubber ply 500.

The monitor apparatus or device of this invention can be used either with a tire which has been cured to provide a surface area to receive and carry the rubber ply or with an aftermarket tire where a surface area is prepared after curing the tire to receive and carry the rubber ply. Providing a proper surface area for affixing the rubber ply to the inside surface of the tire is achieved by different means. The desired results are the same; which is to have a surface area which permits a positive attachment between a conventional innerliner portion of the tire and the rubber ply of this invention without affecting the integrity of the innerliner portion. Since the conventional innerliner is generally not a clean or properly textured surface, it is necessary to prepare this innerliner by cleaning, buffing or grinding to provide a properly conditioned surface area. Various means for preparing a surface area are known in the industry that can achieve a surface also suitable for affixing a rubber ply without affecting the integrity of the innerliner. The area must be adequate in size and texture for achieving a surface area to accommodate the rubber ply for production and aftermarket tires within the scope of this invention.

Figure 12:
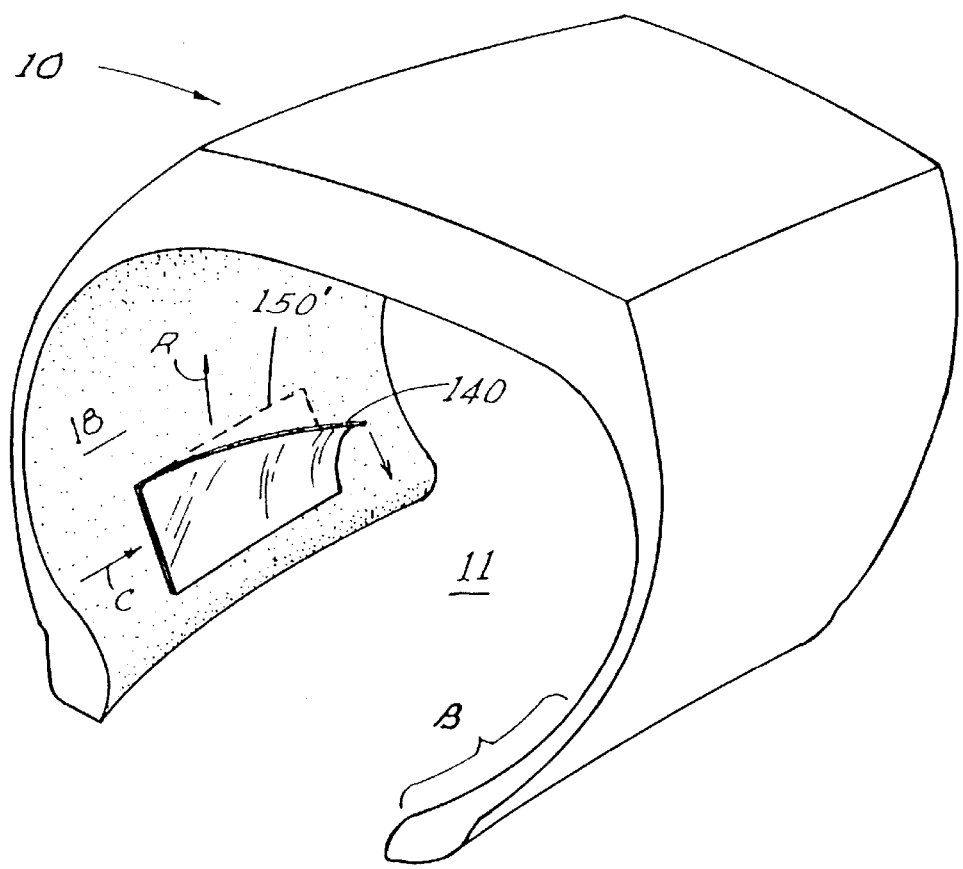
FIG. 12 is a perspective view of a tire showing a plastic sheet being removed from an inside surface of the cured tire to provide a generally smooth and conditioned inner surface area for affixing the rubber ply to the inner surface area of the tire.
Figure 13:
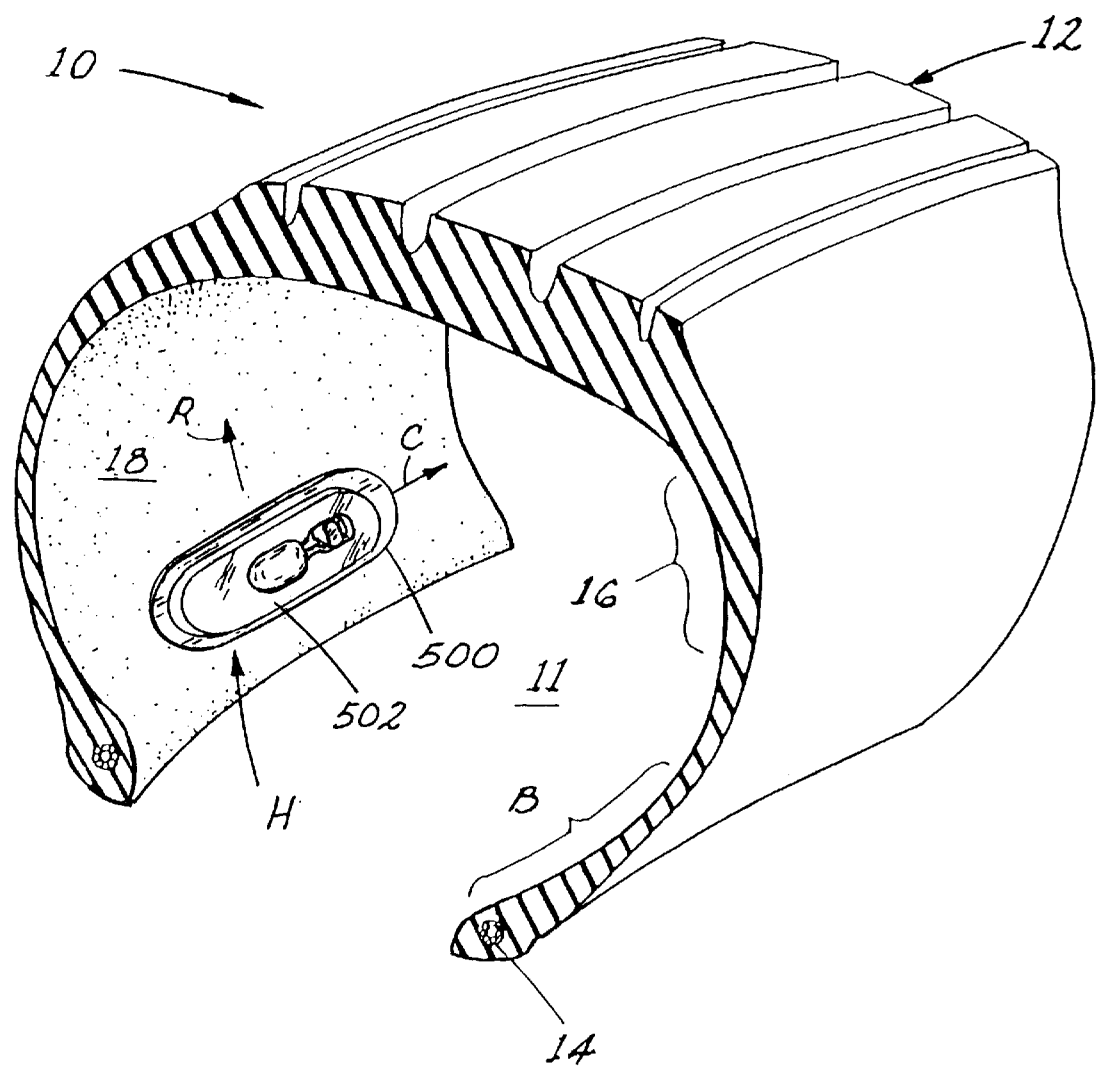
FIG. 13 illustrates another embodiment of a vehicle tire monitor and apparatus for monitoring tire information when operating on a vehicle.
Figure 14:
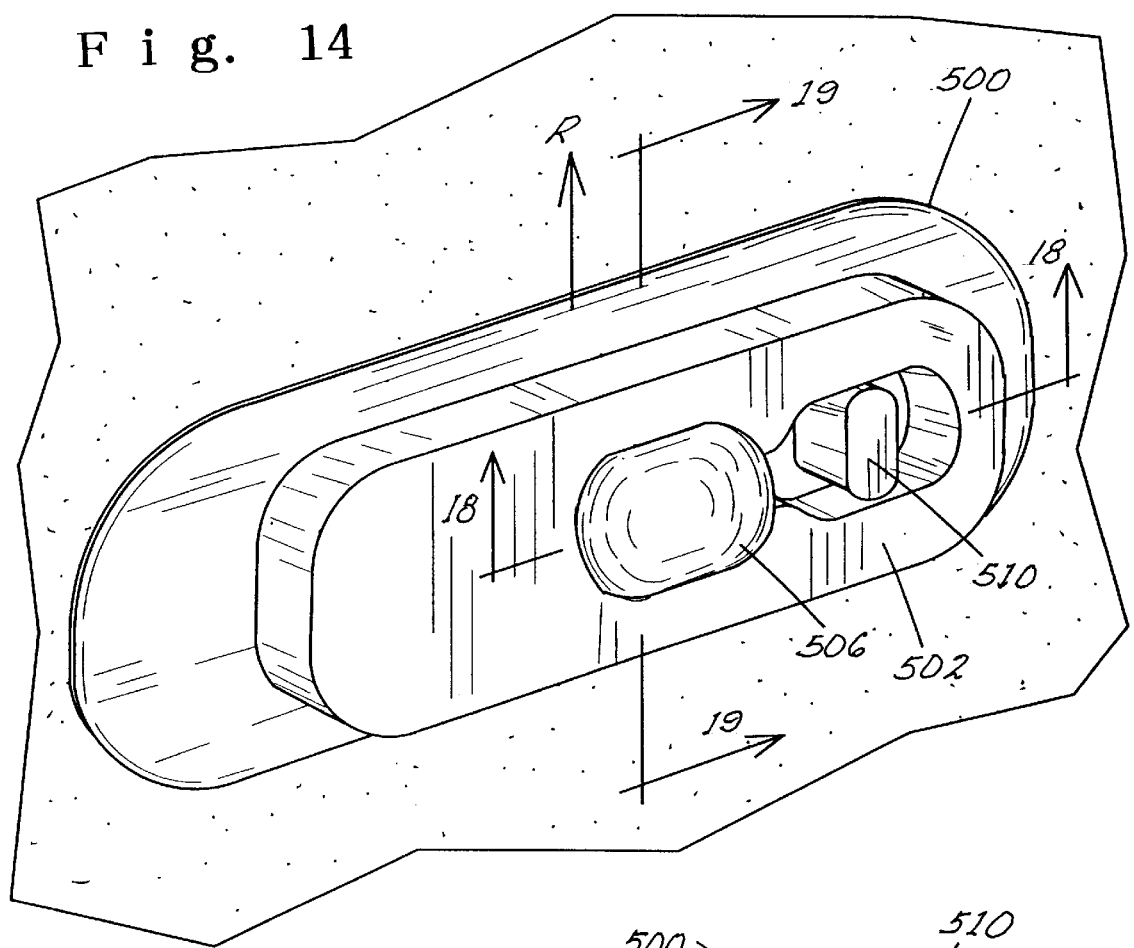
FIG. 14 is a perspective view illustrating vehicle tire monitoring apparatus constructed according to the invention mounted on an interior surface of a tire cavity.
Figure 15:
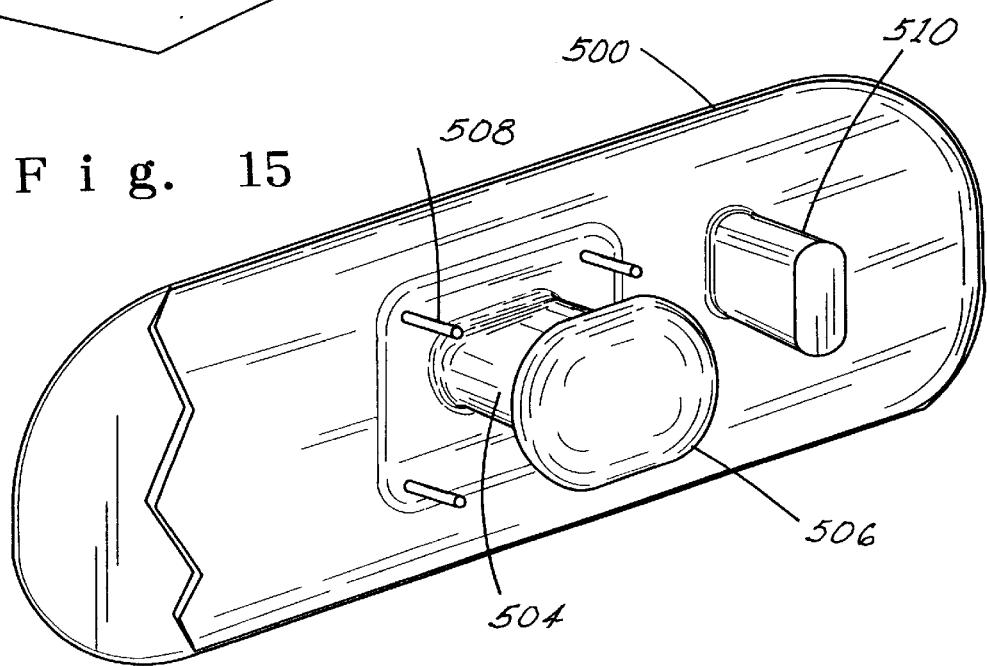
FIG. 15 is a perspective view of a rubber ply for being affixed to a tire cavity which embodies a module retainer assembly and motion damping element according to the invention.
Figure 16:
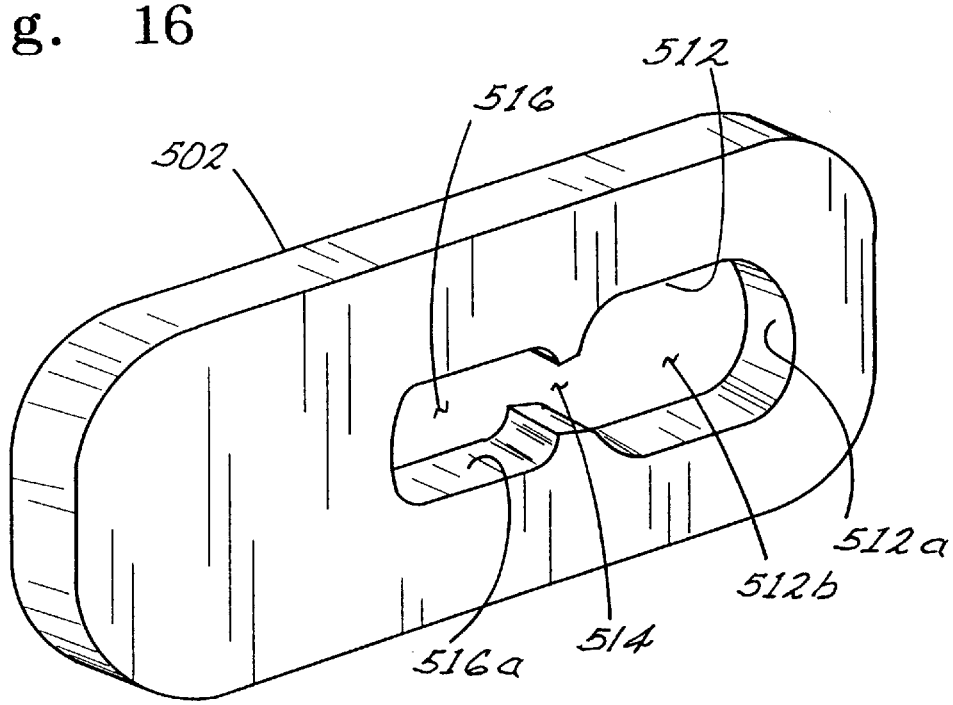
FIG. 16 is a perspective view of a monitor module constructed according to the present invention for being affixed with the rubber ply of FIG. 15 for carrying a electronic monitor within the tire cavity.
Figure 17:
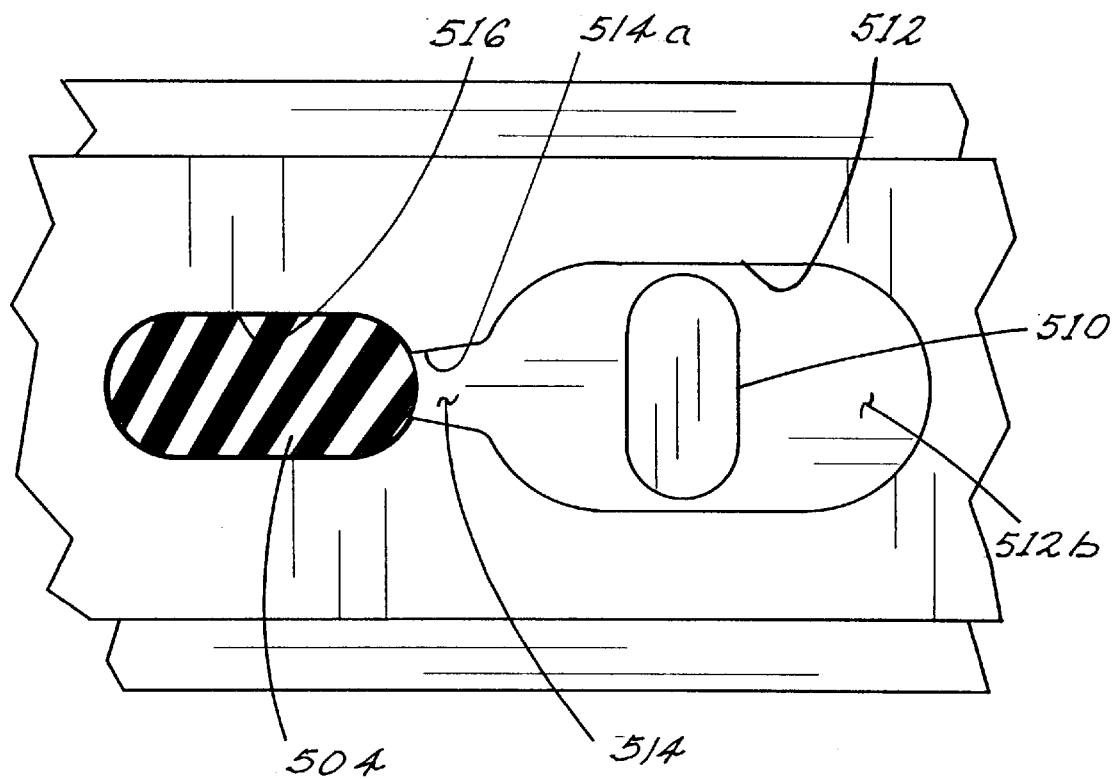
FIG. 17 is a plane view taken through the retention stem of a retainer assembly according to the invention for securing the monitor module of FIG. 16 to the rubber ply of FIG. 15.
Figure 18:
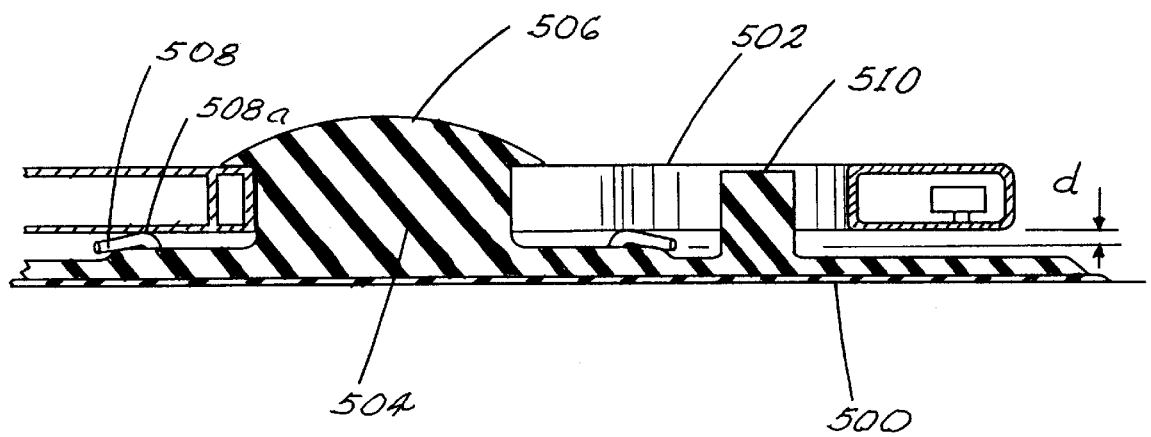
FIG. 18 is a side elevation of vehicle tire monitoring apparatus according to the invention; and, FIG. 19 is a sectional view taken along line 19—19 of FIG. 18.
Figure 19:
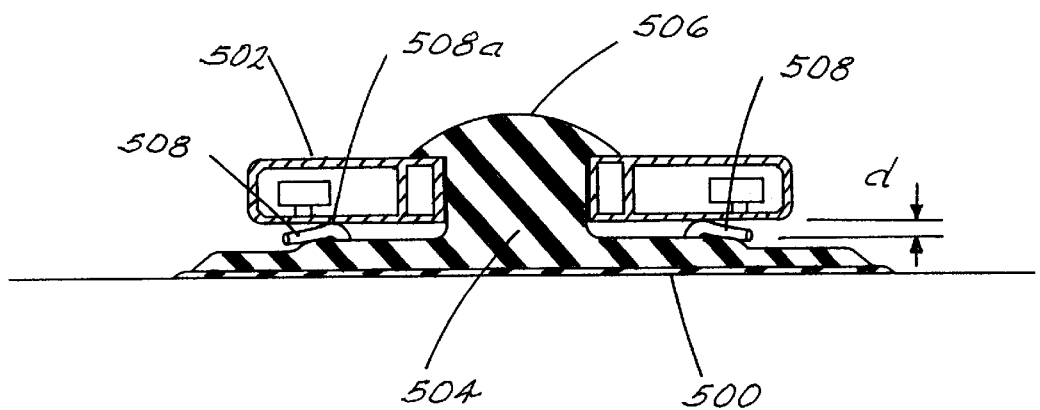

As can best be seen in FIG. 12, a means and method for providing a surface area within the tire during curing of the tire for attachment of the tire monitor apparatus or monitored vehicle tire and method of this invention is illustrated. A sheet 140 is applied directly to a surface area 150' on the inner surface 18 of the tire 10 in a bead area B on either side of the tire prior to curing the tire. Preferably, a fabric, plastic or rubber sheet is used to provide a conditioned surface area when forced into the inner surface of the tire during curing of the tire. The generally smooth sheet 140 can be made using any suitable compound impermeable to silicon. The sheet is removed after a given post-cure time to provide a conditioned, treated, clean and smooth surface area within the tire suitable for affixing the rubber ply to surface area 150'.

It is also possible to attach a rubber ply directly to the inside of a tire during curing of the tire as a further variation of the aspects of the tire monitor apparatus to provide a vehicle tire which can be monitored. The rubber plies disclosed above or those of a similar size and material can be positioned within the green tire prior to curing of the tire. Careful control of the rubber ply when it is installed in the green tire in used to maintain the integrity of the tire innerliner during curing of the tire and after the tire is cured.

Thus, it can be seen that the advantageous construction and method can be realized according to the invention for providing a monitored vehicle tire with rubber plies and a retainer assembly for retaining a generally rigid module within the tire. Alternative locations within the tire can also be selected for locating the surface area within the tire where the module will be placed in an offset position. Modules of different shape and size from those illustrated can also be supported by the tire monitor apparatus of the invention, and further by using the method of this invention. Alternative features of the rubber ply and retainer assembly G for securing the module at an offset position with respect to the rubber ply within the tire are disclosed. These features are for supporting various modules within the tire to provide a vehicle tire monitor apparatus and, along with the tire, a monitored vehicle tire.

While a preferred embodiment of the invention has been described using specific terms, such description is for illustrative purposes only, and it is to be understood that changes and variations may be made without departing from the spirit or scope of the following claims.

What is claimed is:

1. Vehicle tire monitor apparatus for monitoring tire information on a vehicle comprising:
    a rubber ply having a first side affixable to an interior surface of the tire at a predetermined location within a cavity of the tire;
    a monitor module carried by a second side of said rubber ply for containing a monitor which monitors the tire information;
    a module retainer assembly having a first fastener part for securing said monitor module to said rubber ply; and,
    a motion damping element operatively engaged between said rubber ply and said monitor module independent of said first fastener part for reducing movement and vibrations of said monitor module.

2. The apparatus of claim 1 wherein said first fastener part is carried by said rubber ply and said retainer assembly includes a complementary, second fastener part carried by said module, said first and second fastener parts cooperating to securely fasten said monitor module to said rubber ply.

3. The apparatus of claim 2 wherein said first fastener part includes a stem having one end affixed to said rubber ply; and said second fastener part includes a keyway formed in said monitor module having a first portion for engaging said stem and a second portion for engaging said motion damping element when said module is secured to said rubber ply.

4. The apparatus of claim 3 wherein said stem includes a retainer button carried by a remote end of said stem for limiting axial movement of said monitor module away from said rubber ply when said stem is secured in said first portion of said keyway.

5. The apparatus of claim 4 wherein said first portion of said keyway includes a retention slot formed in said module for receiving said stem whereby said module monitor is retained by said stem and retainer button.

6. The apparatus of claim 5 wherein said second portion of said keyway includes an entrance formed through said monitor module for receiving said retainer button and stem, and said keyway includes a guide slot formed between said entrance and said retention slot for guiding said stem from said entrance into said retention slot.

7. The apparatus of claim 6 wherein said guide slot is tapered inwardly towards said retention slot to resist movement of said stem from said retention slot.

8. The apparatus of claim 7 wherein said motion damping element includes a protuberance which is received in said entrance of said module monitor when said stem is received in said retention slot, said entrance being defined by at least one sidewall for engaging said protuberance to reduce movement and vibrations of said monitor module.

9. The apparatus of claim 1 including an isolation mount disposed between said rubber ply and said module monitor for mounting said monitor module in an offset distance with respect to said rubber ply so that the durability of the monitor module and the tire is increased.

10. The apparatus of claim 9 wherein said isolation mount comprises said stem of said module retaining assembly having a sufficient length to allow said monitor module to be affixed near a remote end of said stem at said offset distance from said rubber ply and be retained at said offset distance.

11. The apparatus of claim 1 0 including a retainer button carried near said remote end of said stem to maintain said monitor module at said offset distance from said rubber ply.

12. A vehicle tire monitor apparatus for monitoring tire information of a tire mounting to a vehicle, wherein the tire has an interior surface defining an interior tire cavity when said apparatus comprises:
    a rubber ply having a first side for being affixed to said interior surface at a predetermined location within the tire cavity;
    a monitor module for being secured to said rubber ply and for containing a monitor which monitors the tire information while on the vehicle;
    a module retainer assembly for securing said module to said rubber ply which includes a first fastener part carried by said rubber ply and a second, complementary fastener part carried by said module monitor so that said first and second fastener parts secure said module monitor together when said rubber ply is affixed in the tire cavity; and,
    a motion damping element carried by said rubber ply spaced from said first fastener part for engaging said monitor module when affixed to said rubber ply for reducing movement and vibrations of said monitor module during operation of the vehicle.

13. The apparatus of claim 12 wherein said first fastener part and said motion damping elements are longitudinally spaced on said rubber ply.

14. The apparatus of claim 13 wherein said first fastener part includes a stem having one end affixed to said rubber ply which engages said complementary, second fastener part of said monitor module for securing said monitor module to said rubber ply.

15. The apparatus of claim 14 wherein said stem includes a retainer button carried by a remote end of said stem for limiting the axial movement of said monitor module on said stem in a direction away from said rubber ply.

16. The apparatus of claim 15 wherein said second fastener part includes a retainer opening formed in said module for receiving said stem whereby said module monitor is retained by said stem and retainer button.

17. The apparatus of claim 16 wherein said second fastener part includes an entrance formed through said monitor module for receiving said retainer button, and a guide slot formed between said entrance and said retention slot for guiding said stem from said entrance into said retention slot.

18. The apparatus of claim 17 wherein said guide slot is tapered inwardly towards said retention slot to resist movement of said stem from said retention slot.

19. The apparatus of claim 18 wherein said motion damping element includes a protuberance which is received in said entrance of said module monitor when said stem is received in said retention slot, said entrance being defined by at least one sidewall wherein said protuberance engages said sidewall to reduce movement and vibrations of said monitor module.

20. The apparatus of claim 12 including an isolation mount disposed between said rubber ply and said module monitor for mounting said monitor module in an offset distance with respect to said rubber ply so that the durability of the monitor module and the tire is increased.

21. The apparatus of claim 19 wherein said retainer assembly includes a stem having a sufficient length to allow said monitor module to be affixed near a remote end of said stem at the offset distance from said rubber ply and be retained at said offset distance.

22. The apparatus of claim 21 including a retainer button carried near said remote end of said stem to maintain said monitor module at said offset distance from said rubber ply.

23. The apparatus of claim 20 including a plurality of resilient elements which deform and become sandwiched between said rubber ply and said monitor module.

* * * * *